US010251015B2

(12) United States Patent
Bahne et al.

(10) Patent No.: US 10,251,015 B2
(45) Date of Patent: Apr. 2, 2019

(54) PERSONAL MULTICHANNEL AUDIO CONTROLLER DESIGN

(71) Applicant: DIRAC RESEARCH AB, Uppsala (SE)

(72) Inventors: Adrian Bahne, Uppsala (SE); Anders Ahlen, Knivsta (SE)

(73) Assignee: DIRAC RESEARCH AB, Uppsala (SE)

( * ) Notice: Subject to any disclaimer, the term of this patent is extended or adjusted under 35 U.S.C. 154(b) by 38 days.

(21) Appl. No.: 15/504,534

(22) PCT Filed: Aug. 21, 2014

(86) PCT No.: PCT/SE2014/050956

§ 371 (c)(1),
(2) Date: Feb. 16, 2017

(87) PCT Pub. No.: WO2016/028199

PCT Pub. Date: Feb. 25, 2016

(65) Prior Publication Data

US 2017/0238118 A1 Aug. 17, 2017

(51) Int. Cl.
*G06F 17/00* (2006.01)
*H04S 7/00* (2006.01)

(52) U.S. Cl.
CPC .............. *H04S 7/305* (2013.01); *H04S 7/302* (2013.01); *H04S 2400/01* (2013.01)

(58) Field of Classification Search
CPC ....... H04S 7/305; H04S 7/302; H04S 2400/01
See application file for complete search history.

(56) References Cited

U.S. PATENT DOCUMENTS 4,502,149 A 2/1985 Gefvert
4,817,162 A 3/1989 Kihara
(Continued)

FOREIGN PATENT DOCUMENTS

EP 2369852 A1 9/2011
WO 2007/106551 A1 9/2007
(Continued)

OTHER PUBLICATIONS

Brian D. O. Anderson, et al., Optimal Control: Linear Quadratic Methods, Prentice Hall Information and System Science Series, 1989, pp. v-380, Prentice-Hall, Inc., Englewood Cliffs, New Jersey.
(Continued)

*Primary Examiner* — Md S Elahee
*Assistant Examiner* — David Siegel
(74) *Attorney, Agent, or Firm* — Young & Thompson

(57) ABSTRACT

Disclosed is a method for determining filter coefficients of an audio precompensation controller for the compensation of an associated sound system, including N≥2 loudspeakers, including estimating, for each one of at least a pair of the loudspeakers, a model transfer function at each of M control points distributed in Z≥2 spatially separated listening zones in a listening environment of the sound system. The method also includes determining, for each of the M control points, a zone-dependent target transfer function at least based on the zone affiliation of the control point; and determining the filter coefficients of the audio precompensation controller at least based on the model transfer functions and the target transfer functions of the M control points. Consequently, an audio precompensation controller for an associated sound system can be obtained that enables improved and/or customized sound reproduction in two or more listening zones simultaneously.

20 Claims, 17 Drawing Sheets

(56) References Cited

U.S. PATENT DOCUMENTS

| | | | | |
|---|---|---|---|---|
| 4,908,858 | A | 3/1990 | Ohno | |
| 5,033,092 | A | 7/1991 | Sadaie | |
| 6,574,339 | B1 | 6/2003 | Kim et al. | |
| 6,876,748 | B1 | 4/2005 | Petroff | |
| 7,343,020 | B2 | 3/2008 | Thigpen | |
| 8,213,637 | B2 | 7/2012 | Brannmark et al. | |
| 9,049,533 | B2 | 6/2015 | Christoph et al. | |
| 2005/0063554 | A1* | 3/2005 | Devantier | H04S 7/302 381/99 |
| 2010/0305725 | A1* | 12/2010 | Brannmark | H04S 7/301 700/94 |
| 2011/0103590 | A1* | 5/2011 | Christoph | H04S 7/302 381/17 |

FOREIGN PATENT DOCUMENTS

| | | | |
|---|---|---|---|
| WO | 2013/141768 | A1 | 9/2013 |
| WO | 2014/007724 | A1 | 1/2014 |

OTHER PUBLICATIONS

Matthias Arlbrant, Sound quality enhancement of automotive audio systems, Master's Thesis in the Master's programme in Sound and Vibration, 2009, pp. iii-91, Chalmers University of Technology, Göteborg, Sweden.

Jerry Bauck, et al., Generalized Transaural Stereo and Applications, Journal of the Audio Engineering Society, Sep. 1996, pp. 683-705, vol. 44, No. 9

Jens Blauert, Spatial Hearing: The Psychophysics of Human Sound Localization, The Journal of the Acoustical Society of America, 1985, vol. 77, Issue 1, The MIT Press, Cambridge, Massachusetts.

Lars-Johan Brännmark, Robust Audio Precompensation with Probabilistic Modeling of Transfer Function Variability, IEEE Workshop on Applications of Audio and Acoustics, Oct. 18-21, 2009, pp. 193-196.

Lars-Johan Brännmark, Compensation of Loudspeaker—Room Responses in a Robust MIMO Control Framework, IEEE Transactions on Audio, Speech, and Language Processing, Jun. 2013, pp. 1201-1216, vol. 21, No. 6.

Lars-Johan Brännmark, Spatially Robust Audio Compensation Based on SIMO Feedforward Control, IEEE Transactions on Signal Processing, May 2009, pp. 1689-1702, vol. 57, No. 5.

David Clark, Stereo in Automobiles, Audio Engineering Society 8th International Conference, May 1990, pp. 237-244.

F. Alton Everest, et al., Master Handbook of Acoustics, May 31, 2009, pp. vii-510, Fifth Edition, McGraw-Hill.

Hugo Fastl, et al., Psychoacoustics: Facts and Models, 2006, pp. VIII-462, Springer-Verlag.

Sebastian Möller, et al., Quality of Experience: Advanced Concepts, Applications and Methods, T-Labs Series in Telecommunication Services, 2014, Springer Cham.

Anthony Grimani, A Stereophonic Imaging System for Car Audio, Audio Engineering Society 91st Convention, Oct. 4-8, 1991, pp. 1-9.

Thomas Kailath, Linear Systems, 1980, pp. xiii-682, Prentice-Hall, Inc., Englewood Cliffs, New Jersey.

V. Kucera, Analysis and design of discrete linear control systems, 1991, pp. viii-472, Prentice-Hall.

Huibert Kwakernaak, Linear Optimal Control Systems, 1972, pp. vii-575, Wiley-Interscience.

Hans Lahti, Dolby Surround Systems in Cars, Audio Engineering Society 15th International Conference, Oct. 1, 1998, pp. 102-106.

David Moore, et al., Optimisation of the Localisation Performance of Irregular Ambisonic Decoders for Multiple Off-Centre Listeners, Audio Engineering Society 128th Convention, May 22-25, 2010, pp. 1-11.

Kenth Öhrn, et al., A Probabilistic Approach to Multivariable Robust Filtering and Open-Loop Control, IEEE Transactions on Automatic Control, Mar. 1995, pp. 405-418, vol. 40, No. 3.

R. Rabenstein, et al., Sound Field Reproduction, Springer Handbook of Speech Processing, 2008, pp. 1095-1114, Springer.

Michael J. Smithers, Improved Stereo Imaging in Automobiles, Audio Engineering Society 123rd Convention, Oct. 5-8, 2007, pp. 1-8.

M. Sternad, et al., LQ Controller Design and Self-tuning Control, 1993, pp. vi-92, Peter Peregrinus, Ltd., London, England.

Michael Sternad, et al., Robust Filtering and Feedforward Control Based on Probabilistic Descriptions of Model Errors, Automatica, 1993, pp. 661-679, vol. 29, No. 3, Pergamon Press Ltd.

Floyd E. Toole, Sound Reproduction: Loudspeakers and Rooms, 2008, pp. v-550, Focal Press.

David Griesinger, Spatial Impression and Envelopment in Small Rooms, Audio Engineering Society 103rd Convention, Sep. 26-29, 1997, pp. 1-13.

L-J Brannmark, "Robust audio precompensation with probabilistic modeling of transfer function variability", Applications of Signal Processing to Audio and Acoustics, 2009. WASPAA '09. IEEE Workshop on, Oct. 18, 2009, IEEE, Piscataway, NJ, USA, ISBN 978-1-4244-3678-1 ; ISBN 1-4244-3678-8; pp. 193-196.

International Search Report cited in Application No. PCT/SE2014/050956, dated Apr. 27, 2015.

European Search Report issued in Application No. 14900064.8, dated Mar. 16, 2018.

* cited by examiner

PERSONAL MULTICHANNEL AUDIO CONTROLLER DESIGN

TECHNICAL FIELD

The proposed technology generally relates to a method and system for determining filter coefficients of an audio precompensation controller for the compensation of an associated sound system, a corresponding computer program and carrier for a computer program, and an apparatus for determining filter coefficients of an audio precompensation controller, a corresponding audio precompensation controller, and an audio system comprising a sound system and an improved audio precompensation controller in the input path to the sound system, as well as a digital audio signal.

BACKGROUND

Multichannel sound reproduction systems, including amplifiers, cables, loudspeakers and room acoustics, will always affect the spectral, transient and spatial properties of the reproduced sound, typically in unwanted ways. Whereas the technical quality of the components, such as amplifiers and loudspeakers, can generally be assumed to be high nowadays, sound reproduction nevertheless suffers from sound quality degradation for multiple reasons. Some of them will be discussed in the following.

First, the acoustic reverberation of the room where the equipment is placed has a considerable and often detrimental effect on the perceived audio quality of the system. The effect of reverberation is often described differently depending on which frequency region is considered. At low frequencies, reverberation is often described in terms of resonances, standing waves, or so-called room modes, which affect the reproduced sound by introducing strong peaks and deep nulls at distinct frequencies in the low end of the spectrum. At higher frequencies, reverberation is generally thought of as reflections arriving at the listener's ears some time after the direct sound from the loudspeaker itself. Reverberation at high frequencies cannot be generally assumed to have a detrimental effect on sound quality. Nevertheless, reverberation definitely has an effect on timbral and spatial sound reproduction.

Second, established loudspeaker-based multichannel sound reproduction standards, such as stereo or 5.1 surround (e.g., home cinema systems), generally assume a symmetric setup of the sound system. It is assumed that multichannel signals, which are in some way coded in the recording, are reproduced via loudspeakers that are placed at defined angles and distances from the listener. Such a symmetric setup is usually found in, for example, professional recording studios. In reality however, such a symmetrical setup is unrealistic when considering typical listening environments such as consumer homes. In these environments, other factors such as the furniture, determine the location of the loudspeakers and listener, rather than placing them with regard to the suggestion in the standards. This leads to impaired sound reproduction and consequently detrimental sound quality.

Third, these multichannel standards generally assume one listener, which is located in a certain position, often referred to as sweet spot. This sweet spot is typically rather small and corresponds to a limited region in space. Yet, high fidelity sound reproduction, that is sound reproduction with a high amount of accuracy and trueness with respect to the recording, is only provided in the sweet spot. Outside this limited region, sound reproduction is severely deteriorated. This also yields impaired sound quality for one or several listeners, which are located outside the given sweet spot.

Last, sound reproduction by means of multiple loudspeakers always has a conceptual problem of identity. Exact reproduction of recorded sound by means of multiple loudspeakers in other than the genuine recording environment must be considered an impossible task. This is particularly valid for the spatial aspects of multichannel sound reproduction, which will always correspond to an approximation of the recorded sound field rather than true (high fidelity) reproduction of it. Therefore, sound quality also depends on human expectation and experience with regard to the presented multichannel method. Whereas sound reproduction may not be accurate in many cases, it may still be plausible to the listener, and thus perceived as proper spatial sound reproduction. Therefore, the fidelity of sound reproduction can generally be improved relative to a given listening situation.

SUMMARY

It is an object to provide an improved method of determining filter coefficients of an audio precompensation controller for the compensation of an associated sound system.

It is another object to provide a system configured to determine filter coefficients of an audio precompensation controller for the compensation of an associated sound system.

It is also an object to provide a computer program for determining, when executed by a processor, filter coefficients of an audio precompensation controller.

Yet another object is to provide a carrier comprising a computer program.

Still another object is to provide an apparatus for determining filter coefficients of an audio precompensation controller.

It is also an object to provide an improved audio precompensation controller.

Yet another object is to provide an audio system comprising a sound system and an improved audio precompensation controller in the input path to the sound system.

It is a further object to enable generation of a digital audio signal by an improved audio precompensation controller.

These and other objects are met by embodiments of the proposed technology.

According to a first aspect, there is provided a method for determining filter coefficients of an audio precompensation controller for the compensation of an associated sound system, comprising $N \geq 2$ loudspeakers. The method comprises the following steps:

- estimating, for each one of at least a pair of the loudspeakers, a model transfer function at each of a plurality M of control points distributed in $Z \geq 2$ spatially separated listening zones in a listening environment of the sound system;
- determining, for each of the M control points, a zone-dependent target transfer function at least based on the zone affiliation of the control point; and
- determining the filter coefficients of the audio precompensation controller at least based on the model transfer functions and the target transfer functions of the M control points.

In this way, an audio precompensation controller for an associated sound system can be obtained that enables improved and/or customized sound reproduction in two or more listening zones simultaneously.

By way of example, by using zone-dependent target transfer functions, the sound reproduction can be made similar in the different zones, depending on the listening environment, or at least partly individualized or customized.

According to a second aspect, there is provided a system configured to determine filter coefficients of an audio precompensation controller for the compensation of an associated sound system. The sound system comprises N≥2 loudspeakers. The system is configured to estimate, for each one of at least a pair of the loudspeakers, a model transfer function at each of a plurality M of control points distributed in Z≥2 spatially separated listening zones in a listening environment of the sound system based on a model of acoustic properties of the listening environment. The system is also configured to determine, for each of the M control points, a zone-dependent target transfer function, at least based on the zone affiliation of the control point and the model of acoustic properties. The system is further configured to determine the filter coefficients of the audio precompensation controller at least based on the model transfer functions and the target transfer functions of the M control points.

According to a third aspect, there is provided a computer program for determining, when executed by a processor, filter coefficients of an audio precompensation controller for the compensation of an associated sound system, comprising N≥2 loudspeakers. The computer program comprises instructions, which when executed by the processor causes the processor to:

- estimate, for each one of at least a pair of the loudspeakers, a model transfer function at each of a plurality M of control points distributed in Z≥2 spatially separated listening zones in a listening environment of the sound system;
- determine, for each of the M control points, a zone-dependent target transfer function at least based on the zone affiliation of the control point; and
- determine the filter coefficients of the audio precompensation controller at least based on the model transfer functions and the target transfer functions of the M control points.

According to a fourth aspect, there is provided a carrier comprising the computer program of the third aspect.

According to a fifth aspect, there is provided an apparatus for determining filter coefficients of an audio precompensation controller for the compensation of an associated sound system, comprising N≥2 loudspeakers. The apparatus comprises an estimating module for estimating, for each one of at least a pair of the loudspeakers, a model transfer function at each of a plurality M of control points distributed in Z≥2 spatially separated listening zones in a listening environment of the sound system. The apparatus also comprises a defining module for defining, for each of the M control points, a zone-dependent target transfer function at least based on the zone affiliation of the control point. The apparatus further comprises a determining module for determining the filter coefficients of the audio precompensation controller at least based on the model transfer functions and the target transfer functions of the M control points.

According to a sixth aspect, there is provided an audio precompensation controller determined by using the method of the first aspect.

According to a seventh aspect, there is provided an audio system comprising a sound system and an audio precompensation controller in the input path to the sound system.

According to an eighth aspect, there is provided a digital audio signal generated by an audio precompensation controller determined by using the method of the first aspect.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

Figure 1:
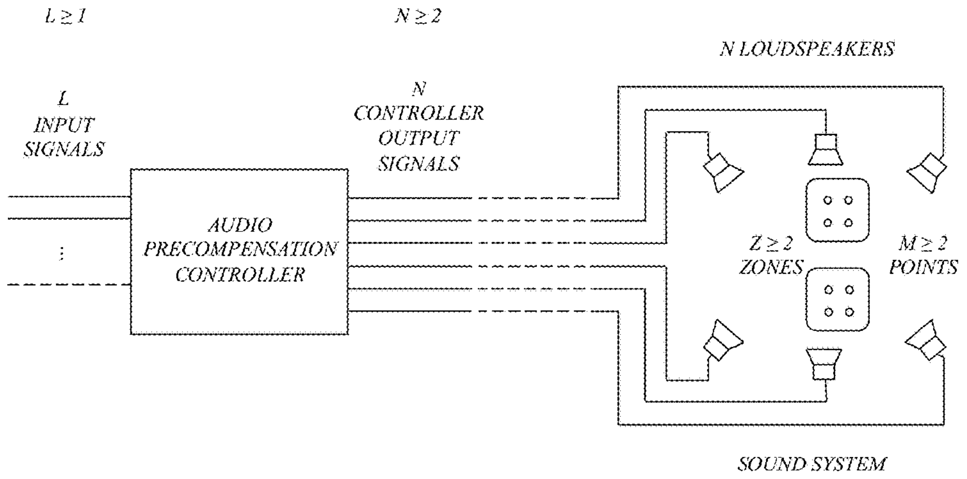
FIG. 1 is a schematic diagram illustrating an example of an audio system comprising a sound system and an audio precompensation controller in the input path to the sound system.

For a better understanding of the proposed technology, it may be useful to begin with a brief overview of an example of an embodied sound system and precompensation controller with reference to FIG. 1.

FIG. 1 is a schematic diagram illustrating an example of an audio system comprising a sound system and an audio precompensation controller in the input path to the sound system. The audio precompensation controller has $L\geq 1$ input signals. The sound system comprises $N\geq 2$ loudspeakers and $Z\geq 2$ listening zones, which are covered by a total of $M\geq 2$ control points.

Standardized multichannel audio systems, such as stereo or 5.1 surround, which are represented by the sound system shown in FIG. 1, are by default designed for solely one listener and one zone. Only in a single listening region, or zone, referred to as the sweet spot, are sounds perceived by the listener as intended by the record producer, see, e.g., [34, Ch. 8]. In the following we shall use the terms listening region, listening position, listening zone, and sweet spot, interchangeably to describe a region for which a human listener will be obtaining an optimized sound experience.

Figure 2:
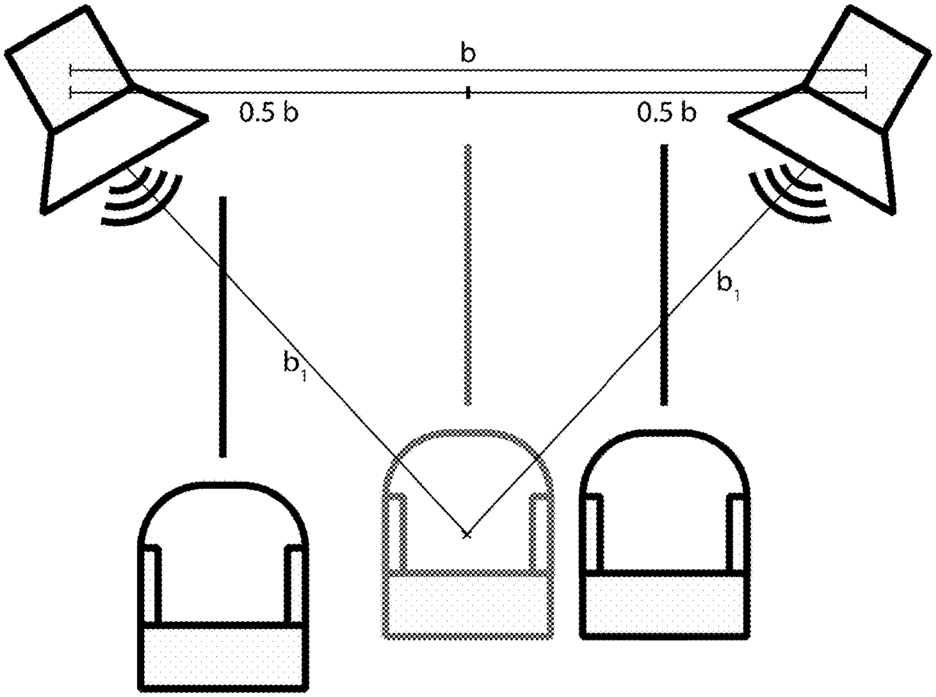
FIG. 2 is a schematic illustration of a sound system comprising two loudspeakers and three listening zones, where the grey seat represents the traditional sweet spot and the black seats represent unsymmetrical listening zones for which the sound reproduction must be equalized.

For a single listener, the sweet spot can be placed at different locations, for example, by the use of appropriate delay and gain adjustments to the loudspeaker channels. Traditionally, the sweet spot is positioned in a location equidistant to the loudspeakers at a certain distance and height, see the grey seat in FIG. 2 for an example, where the sweet spot is located at half the distance b between the loudspeakers, and where the distances $b_1$ from the center of the sweet spot to the two loudspeakers are equal. We shall here go beyond the single sweet spot case and investigate the design of multiple listening positions, or zones, for multichannel audio systems. These listening zones are located outside the traditional sweet spot and are not considered by standard multichannel sound reproduction, see the illustrative example in FIG. 2 (black seats). We refer to such designs as personal multichannel sound reproduction. The word personal should be understood as an individual sound experience for each listener, i.e., each listener obtains his/her own sweet spot.

In multichannel audio systems, virtual sound sources are created by multiple loudspeakers simultaneously radiating sound. In a traditional stereo setup, two loudspeakers are placed equidistant in front of the listener, with an angle of typically 30° to the left and right of the listener, see FIG. 2 for a schematic illustration. In general, the location of a virtual sound source is determined by differences in intensity and time of arrival of the two channels. When both loudspeakers simultaneously reproduce a signal with equal intensity and phase at the listeners ears, the resulting sound source is located in front of the listener. When sitting in the sweet spot, this location corresponds to the point in the middle between the two loudspeakers, and is referred to as the phantom center. By changes in intensity and phase of the two channels, the location of virtual sound sources can be moved between the two loudspeakers [5] [13, Ch. 3] [14, Ch. 15.4]. The same reasoning can be applied to other multichannel sound reproduction standards such as 5.1 or 7.1 surround.

Outside the sweet spot, the intensity and time of arrival differences at the listener's ears differ from those in the sweet spot, resulting in differently perceived virtual sources. In listening positions outside the sweet spot, the precedence effect causes a shift of the sound image towards the nearest loudspeaker [5]. However, multichannel audio productions are produced with one listener in mind who is sitting in the sweet spot. Hence, spatial reproduction of multichannel sound is severely deteriorated in other listening positions than the sweet spot and spatial fidelity in several listening positions is in general not attainable by the use of standard multichannel audio systems.

Creation of Multiple Sweet Spots

In the following we shall discuss the challenge of using standard multichannel audio systems as a means for creating multiple sweet spots, which are separated in space and subject to spatial fidelity. Numerous attempts to solve to this challenge have been reported in the literature, and we will discuss a number of them next.

In automotive audio systems, a dashboard center speaker is frequently used to create spatial fidelity, especially in the two front seats, see, e.g., [11][17][23]. However, placing a loudspeaker in the center of the dashboard is rather costly and it is some times also unfeasible due to space constraints. Nowadays, the majority of all standard automotive sound systems are four-channel systems without a center speaker.

Passive solutions, such as loudspeaker placement, or controlling reflections and loudspeaker radiation, are proposed in the literature, see, e.g., [11][16][33]. These solutions are however limited to higher frequencies, above the important frequency range where voices and the fundamentals of many instruments lie, but they may serve as complementary means to improve spatial fidelity in multiple zones.

Binaural systems constitute another proposed solution. In [4], transaural stereo is discussed as a means to generate desired sound fields at the listeners' ears. Transaural stereo is a signal processing technique that precisely controls the sound field at the listeners ears based on cross-talk cancellation. Several scenarios with different combinations of loudspeakers, inputs and listeners (ears), are discussed. It is argued that, in general, the reproduction of virtual sources with transaural stereo is potentially superior to standard stereo. Example solutions are derived for most scenarios. However, the case with two loudspeakers, two inputs, and two listeners (four ears) is not discussed. According to [4], the system is in this case overdetermined and an exact solution does not exist. Further, including room correction in the design is subject to enormous complications and some of the signal processing techniques bring potential problems due to, amongst others, non-causal filters and unstable head-related transfer functions.

Further, sound field synthesis techniques are an option to create multiple sweet spots. In [25], an Ambisonics system approach to multiple off-center listeners is presented. The usage of wave-field synthesis (WFS), vector-based amplitude panning and Ambisonics is described in [15][28]. In general however, Ambisonics solutions require several loudspeakers positioned in a circular, or spherical, layout around the listeners. WFS approaches also require a small spacing between the involved loudspeakers, and thus high numbers of loudspeakers are required. These approaches have therefore, so far, been of limited use for many applications.

A related method is proposed in [7], where sound field control is proposed for multiple listening regions. The basic idea is to make the listeners in different positions of, e.g., a car compartment perceive a sound field similar to what would have been the case if the listeners would have been sitting in an ordinary listening room. The method presented in [7] is thus a matter of creating virtual sound sources. If, for example, a stereo or surround source material is to be presented in a car compartment, then the proposed method presented in [7] is transforming the sound field so that all the listeners in the car compartment will perceive the same sound experience as if they were sitting in an ordinary living room with a stereo or surround set-up. While this sound field transformation is excellent for the posed problem, it does not consider the situation where all listeners will experience personal stereo or surround in all listening zones simultaneously. As is the case when listening to, e.g., uncompensated stereo or surround in an ordinary car compartment the sound field transformation is still subject to the precedence effect. In other words, even though the sound field transformation proposed in [7] gives a living room experience it does not solve the problem of creating several sweet spots. The novel methodology proposed in this invention solves this problem. A related solution is suggested in [20].

Another approach is to control the sound field, generated by two loudspeakers in two listening positions, by controlling delay as a function of frequency, aiming at the theoretically optimal inter-loudspeaker differential phase (IDP) in two separated zones, see, e.g., [12][24][27][29][30] or other methods related to adjusting the phase responses [10][19]. Based on the relative propagation delay difference, given by the distance between the two loudspeakers to the center of each zone, the resulting IDP in each zone can be determined. The uncompensated IDP in both zones is zero at 0 Hz and varies between ±180° for increasing frequencies. The IDP in the first zone is hereby inverse to the IDP in the second zone. For an example see the grey lines in the bottom diagram of FIG. 3. In the magnitude sum response, broad dips are encountered at frequencies where the IDP is ±180°, see the grey line in the top diagram of FIG. 3. Such a magnitude response is referred to as a comb filter effect and is detrimental to the perceived sound quality for frequencies up to about 5 kHz, see, e.g, [13, Ch. 17] [34, Ch. 9].

Figure 3:
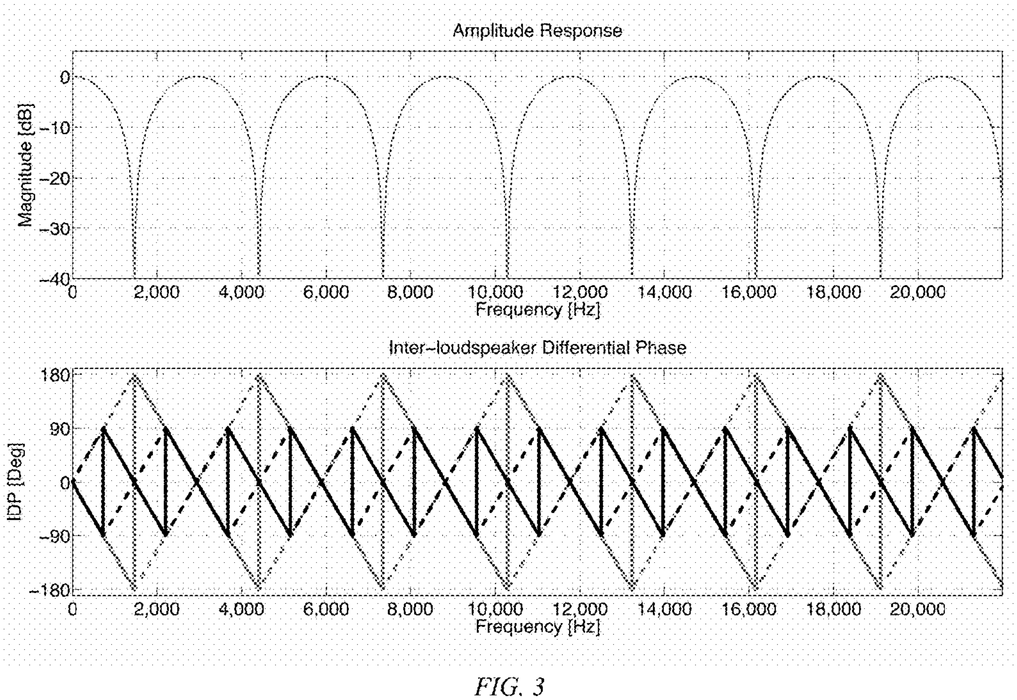
FIG. 3 depicts magnitude response (top diagram) and the inter-loudspeaker differential phase (IDP) (bottom diagram) of a simulated and symmetrical sound system (grey lines) without any reflections, along with the optimal IDP for such a system as suggested in previous work (black lines).

Allpass filters can be used to compensate the IDP in each zone such that the compensated IDP is mainly in phase for all frequencies, i.e., that the compensated system has a maximum relative phase difference of ±90° in both zones, see the black lines in FIG. 3. The resulting dips in the compensated magnitude responses are then narrow and inaudible [12][24][27][29][30]. Using such allpass filter methods works fine in listening environments with no reflections. However, such listening environments exist only in theory or in free-space propagation with symmetrical setups. It can be expected to give reasonable results in some well designed listening environments. Further, such allpass filter methods are limited to two symmetrical off-center listening positions, do not include correction of the magnitude responses, and do not handle phase differences caused by acoustic properties of the listening environment and asymmetric listening zones. In other words, only phase differences due to symmetrical distances between the loudspeakers and the center of each zone are considered. In a car for example, strong early reflections are however encountered and the performance of these methods is therefore in general significantly reduced. The relative propagation delay difference does not describe the acoustic properties of typical listening environments sufficiently well. This will be discussed in more detail in the following sections.

Personal Multichannel Sound Reproduction

Figure 6:
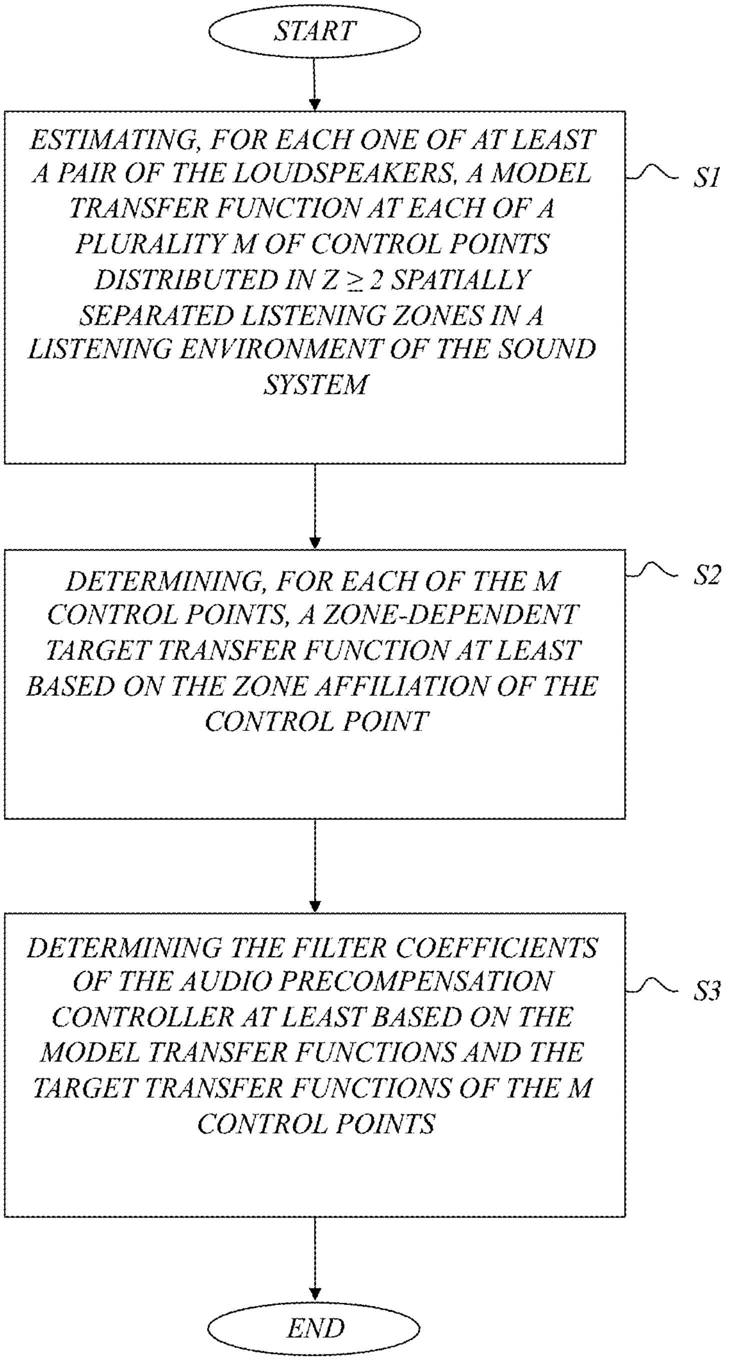
FIG. 6 is a schematic flow diagram illustrating a method for determining an audio precompensation controller according to an exemplary embodiment.

According to a first aspect, there is provided a method for determining filter coefficients of an audio precompensation controller for the compensation of an associated sound system, comprising N≥2 loudspeakers. With reference to FIG. 6, the method comprises the following steps:

S1: estimating, for each one of at least a pair of the loudspeakers, a model transfer function at each of a plurality M of control points distributed in Z≥2 spatially separated listening zones in a listening environment of the sound system.

For example, a model transfer function can here be any model, which is represented in transfer function form, representing the sound propagation from a loudspeaker to a measurement point, or a so called control point. A listening zone comprises a subset of the M control points and can be locate anywhere in the listening environment.

S2: determining, for each of the M control points, a zone-dependent target transfer function at least based on the zone affiliation of the control point.

By way of example, the target transfer function is a description of the desired behaviour of the received sound in each of the M control points. The targets may be set differently for the different control points belonging to, or affiliated with, the different zones.

S3: determining the filter coefficients of the audio precompensation controller at least based on the model transfer functions and the target transfer functions of the M control points.

For example, the filter coefficients of the precompensation controller, which determines the precompensation controller's characteristics, can be adjustable parameters of any filter structure, e.g., a Finite Impulse Response (FIR) or an Infinite Impulse Response (IIR) filter.

In this way, an audio precompensation controller for an associated sound system can be obtained that enables improved and/or customized sound reproduction in two or more listening zones simultaneously.

By way of example, by using zone-dependent target transfer functions, the sound reproduction can be made similar in the different zones, depending on the listening environment, or at least partly individualized or customized.

Normally, the listening zones correspond to different human listening positions.

As an example, an objective may be to create similar sound fields in several, spatially separated, listening zones, where at least one of the zones is located outside the traditional so-called sweet spot. It may, for example, be desirable to obtain spatial and timbral fidelity in all zones simultaneously, regardless of their location. This can neither be achieved by standard multichannel sound systems such as, for example, stereo or 5.1 surround, nor can it be obtained for realistic listening environments and reasonable amount of loudspeakers by any method proposed in the literature. In standard multichannel systems, proper sound reproduction with high fidelity is only provided in a single, well defined, listening position; the sweet spot.

The concept of setting a zone-dependent target which differs between zones may for example be used to provide one or more of the following features:

- Improved spatial multichannel sound reproduction in several zones simultaneously.

Improved tonal balance in each zone simultaneously, with similar or possibly differing tonality in each zone.

Filter coefficients that are acoustically adequate for different listening environments and regions.

Filter coefficients that consider the acoustic environment, which is described by model transfer functions.

As a non-limiting example, the filter coefficients may be determined based on optimizing a criterion function, where the criterion function at least comprises a target error related to the model transfer functions and the target transfer functions and optionally also differences between representations of compensated model transfer functions of at least a pair of the loudspeakers.

For example, the model transfer functions and the target transfer functions may be representing impulse responses at the considered control points.

It should be understood that the proposed technology may be applied to more than two listening zones, i.e., $Z \geq 3$.

Similarly, the proposed technology may be applied to more than two loudspeakers, i.e., $N \geq 3$. In this scenario, the proposed technology may, for example, be applied to the loudspeakers in a pair-wise manner, or by simply considering a pair of loudspeakers and using the remaining loudspeaker(s) as optional support loudspeaker(s).

If the optional support loudspeakers are to be used with the current method, then the method comprises the following optional steps of:

specifying, for each one of the L input signal(s), a selected one of the N loudspeakers as a primary loudspeaker and a selected subset S including at least one of the N loudspeakers as support loudspeaker(s), where the primary loudspeaker is not part of the subset;

determining, for each one of the L input signal(s), based on the selected primary loudspeaker and the selected support loudspeaker(s), filter parameters of the audio precompensation controller so that a criterion function is optimized under the constraint of stability of the dynamics of the audio precompensation controller, with the criterion function including a weighted summation of powers of differences between the compensated estimated impulse responses and the target impulse responses over the M control points.

Furthermore, it should be understood that the $L \geq 1$ input signals may be created by upmixing or downmixing source signals to match a desired sound recording standard. By way of example, a single mono source signal may be upmixed to, e.g., stereo ($L=2$) or surround 5.1 ($L=6$). Similarly, a 7.1 surround source signal can be downmixed to stereo ($L=2$) or 5.1 ($L=6$) surround. It is furthermore obvious for a person skilled in the art that a single mono source signal can be used as an input signal ($L=1$), subsequently compensated and fed to at least a pair of loudspeakers.

Figure 7:
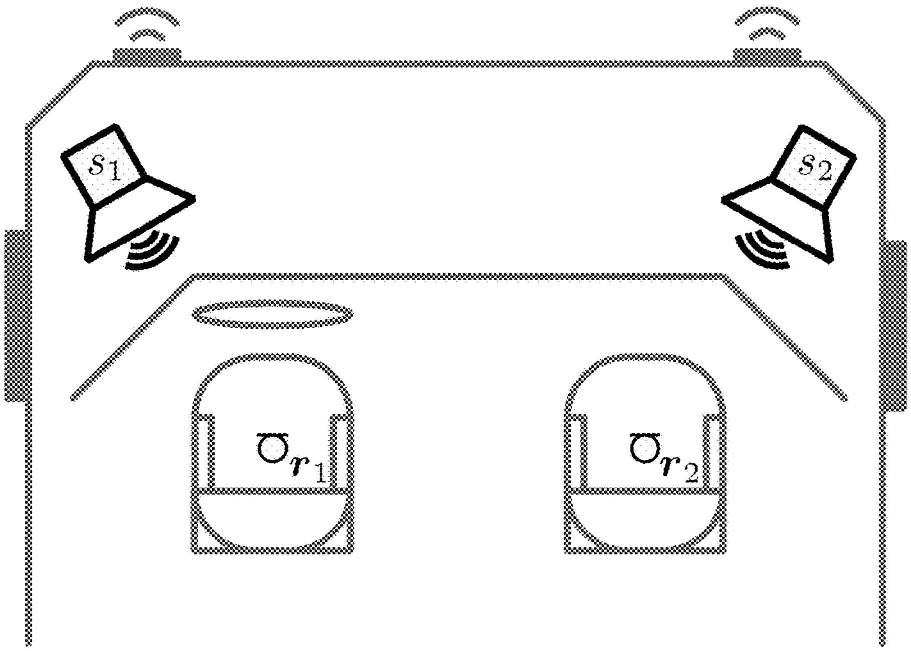
FIG. 7 is a schematic illustration of a symmetric car sound system setup with two loudspeakers and two control points, one in each listening zone.
Figure 8:
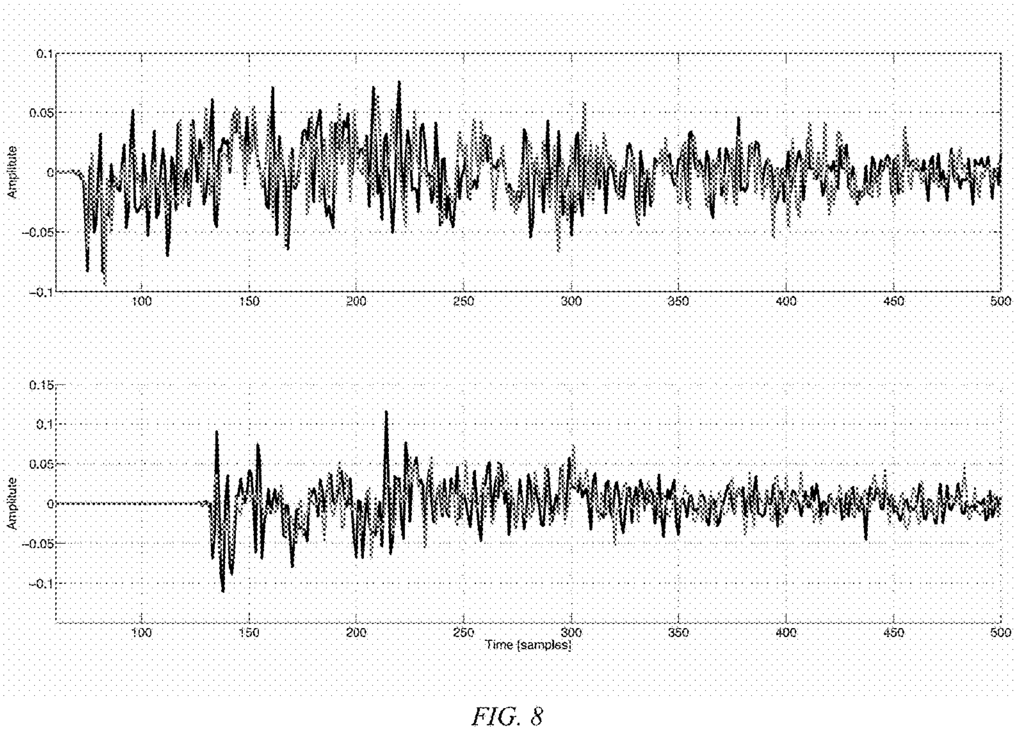
FIG. 8 compares the measured impulse responses that are expected to be symmetric for a symmetric setup as shown in FIG. 7.

In a particular example, the model transfer functions are acoustically unsymmetrical for both symmetrical and unsymmetrical setups in relation to the position of the loudspeakers and the listening zones. As an example, a symmetric car sound system setup with two loudspeakers and two control points, one in each listening zone, is shown in FIG. 7. Whereas the propagation delays between the loudspeakers to the control points are perfectly symmetrical, such a symmetric setup will not lead to symmetric acoustical measurements. For example, the measured impulse responses of a setup as shown in FIG. 7 are depicted in FIG. 8. The top diagram of FIG. 8 shows the impulse responses from the left (black) and right (grey) loudspeaker in the adjacent zones, the bottom diagram shows the impulse responses of the loudspeakers in the remote zones. If a setup is completely symmetrical, then the corresponding impulse responses would be equal. By inspection a person skilled in the art can see that only the propagation delays (represented by the first pulses in the corresponding impulse responses) are symmetrical between loudspeakers, whereas the impulses responses otherwise are not identical (symmetrical), as would be the case in a perfectly symmetrical acoustic environment. For unsymmetrical setups, the impulse responses are inevitably unsymmetrical, too. Consequently, realistic (measured) impulse responses are in general unsymmetrical, despite the symmetry of the setup (loudspeakers and listening zones).

Optionally, the target transfer function in each control point is determined based on phase differences between at least a pair of said loudspeakers in the control point. The phase differences are, for example, defined by the model transfer function in the control point, and the phase characteristics of the zone-dependent target transfer functions typically differ between control points affiliated with different listening zones.

In one example, the step of estimating a model transfer function at each of a plurality M of control points may be based on estimating an impulse response at each of the control points, based on sound measurements of the sound system.

In another example, the step of estimating a model transfer function at each of a plurality M of control points may be based on simulation of an impulse response at each of the control points, wherein the simulation includes first order reflections and/or higher order reflections.

In a particular example, the filter coefficients may be determined based on optimizing a criterion function under the constraint of stability of the dynamics of the audio precompensation controller. For example, the criterion function may include at least a weighted summation of powers of differences between compensated model impulse responses and target impulse response over said M control points, and optionally a weighted summation of powers of differences between representations of compensated model transfer functions of at least a pair of the loudspeakers.

If such an optional similarity requirement is to be used with the current method, then the method comprises the following optional steps of:

specifying, for each one of the L input signals, a selected one of the N loudspeakers as a primary loudspeaker;

specifying, for each of the L input signals, a loudspeaker pair, if feasible, where the loudspeaker pair is required to correspond to input signals that are used for the creation of virtual sound sources.

determining, for each one of the L input signals, based on the selected primary loudspeaker and the selected loudspeaker pair, filter parameters of the audio precompensation controller so that a criterion function is optimized under the constraint of stability of the dynamics of said audio precompensation controller, with the criterion function including a weighted summation of powers of differences between the compensated estimated impulse responses and the target impulse responses over the M control points, or a subset of the M control points, and a weighted summation of powers of differences between representations of compensated model transfer functions of at least a pair of the loudspeakers.

Optionally, the method may further comprise the step of merging the filter coefficients, determined for the Z listening zones, into a merged set of filter parameters for the audio precompensation controller.

In the following, the proposed technology will be described with reference to non-limiting examples of a filter design based on equally non-limiting examples of a model framework.

The objective in the following non-limiting example is to simultaneously create a true personal multichannel audio experience in multiple listening zones. The different zones are spatially separated and at least one of them is located outside the default sweet spot. In the example we suggest the use of a general filter design framework based on MIMO feedforward control with three basic features: (1) Pairwise channel similarity equalization; (2) Possible use of support loudspeakers; (3) Equalization of the model transfer functions to the respective zones based on target transfer functions, which are individually selected for each control point. The characteristics of the phase responses of these target transfer functions differ between zones. The magnitude responses of the target transfer functions are not restricted.

Previous Work

If one only considers phase differences due to the distances from two loudspeakers to the center of two zones, then one already knows the answer to the current problem description. As discussed above, certain allpass filters provide means to equalize the system such that the compensated IDP is predominantly in phase in both zones for a defined range of frequencies. The design of such allpass filters is fairly straightforward. Based on the assumption that the system is entirely described by the distances between the loudspeakers to the center of each zone, the system's behavior can be described by comb filters. Such a comb filter has dips at equally spaced frequencies, where the IDP is maximum, i.e., ±180°, and peaks at equally spaced frequencies where the IDP is completely in phase, i.e., 0°, see FIG. 3. These frequencies are easily calculated [34]. Let d, measured in seconds, be the relative propagation delay difference between two loudspeakers. Then the frequency $f_{d1}$ of the first dip, or the first frequency where the IDP is ±180°, is given by $f_{d1}=½d$. The remaining dips will occur at odd multiples of the first dip, such that $f_{dn}=n/2d$, where $n=2n+1$, $n \in N^+$. The frequencies $f_{pn}$ of the peaks, or the frequencies where the IDP is in phase, are calculated by $f_{pn}=n/d$, $n \in N^+$.

Figure 5:
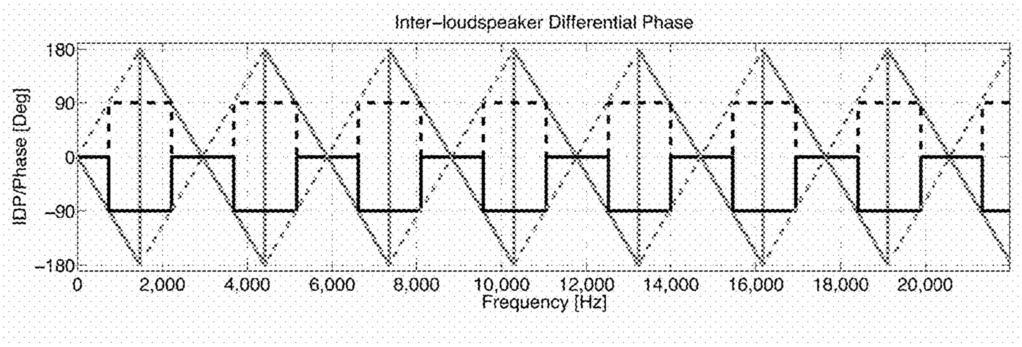
FIG. 5 illustrates an example for complementary allpass filters (solid and dashed black lines) as proposed by previous work along with the corresponding uncompensated IDP (solid and dashed grey lines).

Based on this assumption, the desired allpass filters can be readily designed [12][24][27][29][30]. The basic idea is to apply a 180° phase shift at frequencies where the inter-loudspeaker differential phase (IDP) in a zone is mainly out of phase, i.e., ||DP|>90°. A sound system with two loudspeakers, $s_1$ and $s_2$ and two control points, $r_1$ and $r_2$, one in each of the two zones, is illustrated in FIG. 7. The bottom diagram of FIG. 3 depicts the IDP, based on the propagation delay differences, in control points $r_1$ and $r_2$, illustrated by the solid and dashed grey lines, respectively. The 180° phase shift can either be applied by one allpass filter or, preferably, be distributed between two complementary allpass filters [30]. An example for such complementary allpass filters is illustrated by the solid and dashed black lines in FIG. 5. In theory, such allpass filters yield the desired compensated IDP, which is mainly in phase for all frequencies in both control points. This, in theory, optimal compensated IDP in control points $r_1$ and $r_2$ is shown in FIG. 3 (solid and dashed black line, respectively).

Limitations of Allpass Filter Methods

Figure 4:
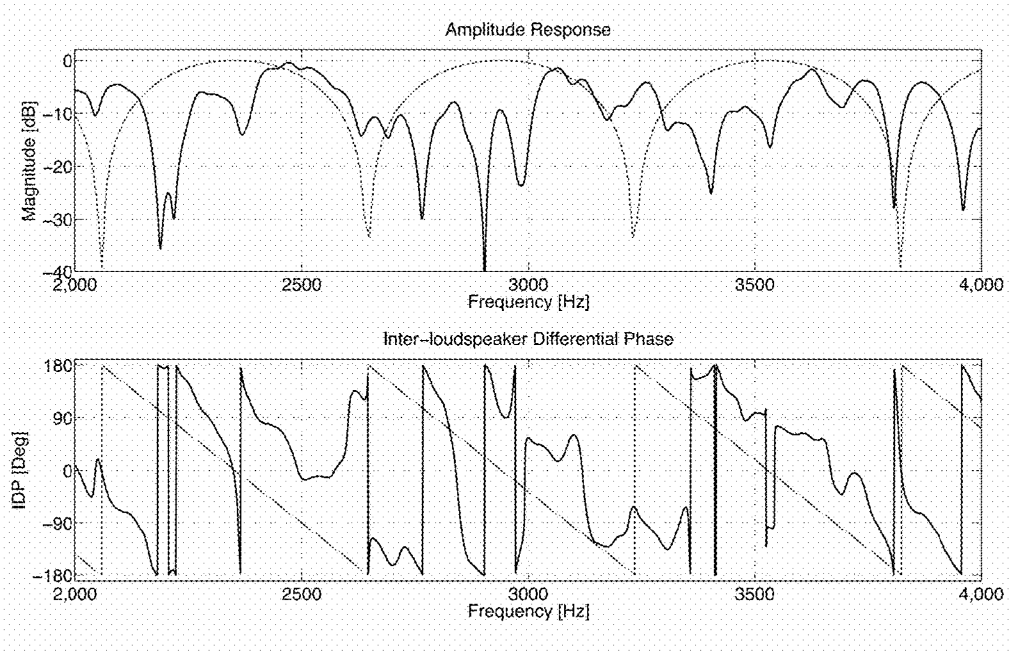
FIG. 4 depicts the IDP and magnitude sum response of measured room transfer functions in one control point (black lines) and the corresponding comb filter based on the propagation delays (grey lines).

When considering measured RTFs in typical listening environments, the IDP between two loudspeakers in a control point does not follow such systematic patterns, which are easy to determine. We shall clarify this by means of an example. FIG. 4 depicts the IDP and magnitude sum response of measured RTFs in one control point (black lines) and the corresponding comb filter based on the propagation delays (grey lines). The measurements are conducted in the left front seat of a car, the relative propagation delay difference of the two loudspeakers in the control point is 1.7 ms. Comparing the graphs in FIG. 4, it is evident that both the IDP and the magnitude sum response are in reality not well described by a comb filter, which is based on the relative propagation delay difference between the loudspeakers in a control point. Whereas designing the allpass filters based on a comb filter is rather straightforward, inspection of FIG. 4 strongly suggests that it can be assumed impossible to determine phase responses with this design strategy under the consideration of realistic acoustic environments. Measured IDPs cannot be described by trivial formulas, which correspond to the comb filter description. This illustrates the demand for novel filter design methods when real acoustic environments are considered.

Another limitation of allpass filter methods lies in their design. Instantaneous phase shifts, as depicted by the black lines in the bottom diagram of FIG. 5, can realistically not be achieved. The order of the allpass filters determines how well the ideal compensated IDP can be reached. A practically useful filter cannot reach the desired IDP perfectly because the ringing in the impulse response would be clearly audible if it did [2][30]. The allpass filters have to be smoothed, for example by choosing low-order IIR allpass filters [30]. Such smoothed allpass filters will however not yield the desired IDP with appropriate accuracy.

We shall in the following non-limiting example introduce the novel method, which is proposed, and highlight its advantages over previous work.

Acoustic Modeling

The acoustic signal path from loudspeaker input to microphone will by way of example be modeled as a linear time-invariant system (LTI), which is fully described by its room transfer function (RTF). The room-acoustic impulse responses of each of N loudspeakers are estimated from measurements at M control points, which are distributed over the spatial regions of the intended Z listening zones, such that each listening zone is covered by $M_Z$ control points. For simplicity, we assume in this example that the number of control points $M_Z$ in each zone is equal, such that the total number M of control points is given by the sum of all $M_Z$ control points. It is recommended that the number of control points M is equal to or larger than the number of loudspeakers N. The dynamic acoustic responses can then be estimated by sending out test signals from the loudspeakers, one loudspeaker at a time, and recording the resulting acoustic signals at all M measurement positions. Test signals such as white or colored noise or swept sinusoids may be used for this purpose. Models of the linear dynamic responses from one loudspeaker to M outputs can then be estimated in the form of, e.g., FIR or IIR filters with one input and M outputs. Various system identification techniques such as the least squares method or Fourier-transform based techniques can be used for this purpose. The measurement procedure is repeated for all loudspeakers, finally resulting in a model transfer function that is represented by a M×N matrix of dynamic models. The multiple-input multiple-output (MIMO) model may alternatively be represented by a state-space description. An example of a mathematically convenient, although very general, MIMO model for representing a sound reproduction system is by means of a right Matrix Fraction Description (MFD) [18] with diagonal denominator, $$\mathcal{H}_n(q^{-1}) = B_n(q^{-1})A_n^{-1}(q^{-1}) = \begin{bmatrix} B_{11n}(q^{-1}) & \dots & \dots & B_{1N_nn}(q^{-1}) \\ \vdots & & & \vdots \\ \vdots & & & \vdots \\ B_{M1n}(q^{-1}) & \dots & \dots & B_{MN_nn}(q^{-1}) \end{bmatrix} \begin{bmatrix} A_{1n}(q^{-1}) & 0 & \dots & 0 \\ 0 & \ddots & & \vdots \\ \vdots & & \ddots & 0 \\ 0 & \dots & 0 & A_{N_nn}(q^{-1}) \end{bmatrix}^{-1}, \quad \text{Eq. (1)}$$

which is the type of MFD that will be utilized in the following. An even more general model can be obtained if the matrix $A^{-1}{}_n(q^{-1})$ is allowed to be a full polynomial matrix, and there is nothing in principle that prohibits the use of such a structure. However, we shall adhere to the structure (1) in the following, as it allows a more transparent mathematical derivation of the optimal controller. Note that the model transfer functions $H_n$ as defined in (1) may include a parameterization that describes model errors and uncertainties, as given by the following example.

Considering a feasible amount of M control points resulting in models obtained from spatially sparse measurement data, we shall employ the stochastic uncertainty model presented in [6][26][32]. Hence, the linear system model is decomposed into a sum of two parts, one deterministic nominal part and one stochastic uncertainty part, where the uncertainty part is partly parameterized by random variables. The nominal part will here represent those components of the model transfer functions that are known to be varying only slowly with respect to space (and which therefore are well captured by spatially sparse RTF measurements), whereas the uncertainty part represents components that are not fully captured by such measurements. Typically, these spatially complex components consist of late room reflections and reverberation at high frequencies. Accordingly, $H_n(q^{-1})$ in (1) is decomposed as $$\mathcal{H}_n(q^{-1}) = \mathcal{H}_{0n}(q^{-1}) + \Delta\mathcal{H}_n(q^{-1}), \quad \text{Eq. (2.1):}$$

where $H_{0n}(q^{-1})$ is the nominal model and $\Delta H_n(q^{-1})$ constitutes the uncertainty model. Writing out the matrix fractions for $H_{0n}(q^{-1})$ and $\Delta H_n(q^{-1})$, the decomposition of Eq. (2.1) can be expressed as $$\begin{aligned} \mathcal{H} &= B_0A_0^{-1} + \Delta BB_1A_1^{-1} \\ &= (B_0A_1 + \Delta BB_1A_0)(A_0A_1)^{-1} \\ &= (\hat{B}_0 + \Delta B\hat{B}_1)(A_0A_1)^{-1} \triangleq BA^{-1} \end{aligned} \quad \text{Eq. (2.2)}$$

Audio Precompensation Controller Design

Consider a multichannel audio sound system comprising N loudspeakers, N≥2 and $1 \le N_n \le N$, around Z bounded three dimensional listening areas $\Omega_Z \in R^3$ in a room. Here, $N_n$, $n \in \{1,2\}$, represents the total number of loudspeakers used for each of the loudspeakers in a considered loudspeaker pair which creates virtual sources. As an example consider a 4-channel automotive loudspeaker system with two listening zones, located in the two front seats. The total number of loudspeakers (called 1, 2, 3, and 4) is then N=4. The total number of listening zones is then Z=2. Suppose that the front left (FL) and front right (FR) loudspeakers reproduce a stereo recording. Further suppose that all N=4 loudspeakers are used in order to improve the sound reproduction of the FL and FR loudspeakers, which yields that the total number of loudspeakers associated with FL and FR is $N_n = N_1 = N_2 = 4$, because the total number of loudspeakers corresponds to the union of $N_1$ and $N_2$: $N = N_1 \cup N_2$. The acoustic output of the system is measured in M control points, or measurement positions, where $M_Z$ control points are uniformly distributed within each listening zone $\Omega_Z$. Let the $N_n$ input signals of the above sound system be represented by a signal vector $u_{1n}(k) = [u_{11n}(k) \dots u_{1N_nn}(k)]^T$ of dimension $N_n \times 1$ and let the M output signals be represented by a signal vector $y_n(k) = [y_{1n}(k) \dots y_{Mn}(k)]^T$ of dimension M×1. Then the relation between $\underline{u}_{1n}(k)$ and $\underline{y}_n(k)$ is given by $$y_n(k) = \mathcal{H}_n(q^{-1})u_{1n}(k), \quad \text{Eq. (3):}$$

where $H_n(q^{-1})$, given by Eq. (1) and Eq. (2.1), is a rational matrix of dimension $M \times N_n$, with elements that are scalar stable rational functions $H_{ijn}(q^{-1})$; i=1, . . . , M; j=1, . . . , $N_n$.

Example Definition of a Target Transfer Function

A target transfer function $D_n$, of dimension M×1, can for example be parameterized as $$\mathcal{D}_n(q^{-1}) = \frac{D_n(q^{-1})}{E_n(q^{-1})} = q^{-d_0}\frac{\tilde{D}_n(q^{-1})}{E_n(q^{-1})}. \quad \text{Eq. (4)}$$

Figure 9:
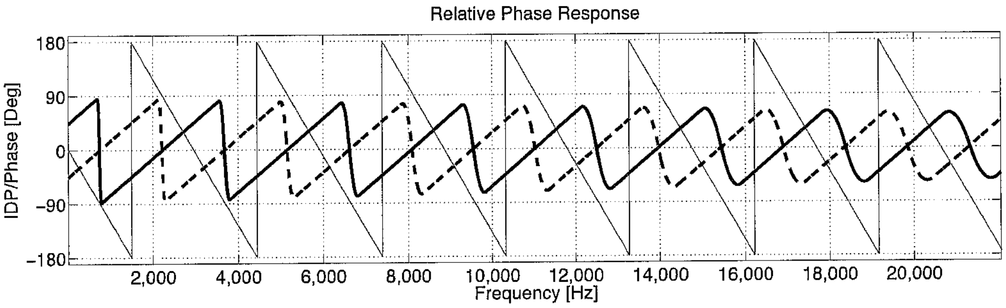
FIG. 9 illustrates a two zone example for the phase responses of the target transfer functions, which differ between listening zones.
Figure 10:
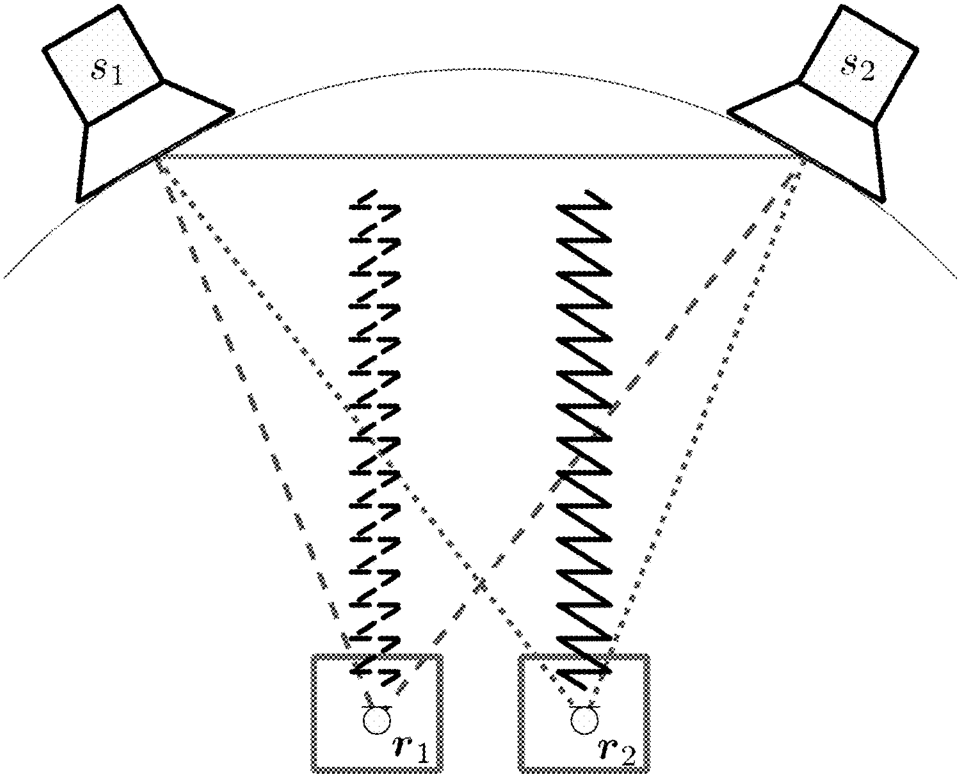
FIG. 10 illustrates schematically, by means of an example, that each target transfer function is affiliated with a listening zone (grey boxes around the control points), and that the phase responses of the target transfer functions differ in their phase characteristics between zones.

In $\tilde{D}_n(q^{-1})$ above, at least one of the polynomial elements is assumed to have a non-zero leading coefficient; the second equality in Eq. (4) is included to emphasize that $D_n$ contains an initial modeling delay of $d_0$ samples. In this example, we will use a FIR model for the targets, and we therefore have that E=1. Further, each control point has an individual target transfer function, which contains an allpass filter. The phase characteristics of the allpass filters differ significantly between control points that are affiliated with different zones. The target D can then be expressed as $$\mathcal{D} \triangleq \begin{bmatrix} D_1 \\ D_2 \end{bmatrix} = \begin{bmatrix} D \\ D \end{bmatrix} = \begin{bmatrix} [D_{\Omega_1} D_{\Omega_2}]^T \\ [D_{\Omega_1} D_{\Omega_2}]^T \end{bmatrix}, \quad \text{Eq. (5)}$$

where $D_{\Omega_Z}$ is of dimension $M_Z \times 1$ and contains the targets for the $M_Z$ control points in listening zone $\Omega_Z$. An example for the differences in the phase responses for Z=2 listening zones and M=2 control points, $M_Z = M_1 = M_2 = 1$, is illustrated in FIG. 9, which depicts the relative phase responses of the target transfer functions in control points $r_1$ (dashed black line) and $r_2$ (solid black line), along with the uncompensated IDP in control point $r_1$ (grey line). FIG. 10 illustrates schematically, by means of an example, that each target transfer function is affiliated with a listening zone (grey boxes around the control points), and that the phase responses of the target transfer functions differ in their phase characteristics between zones.

Example Definition of an Optional Similarity Matrix

A similarity requirement can optionally be included the proposed method. If it is desired to optionally minimize the differences between the loudspeakers of a selected loudspeaker pair, then a similarity matrix P, which is a part of the design, can be included. When P is set to a matrix containing only zeros, then similarity will not be regarded. We will show how to include a similarity requirement by means of an example. The similarity matrix P is defined as follows:

$$P=[\mathrm{diag}(D)|-\mathrm{diag}(D)], \qquad \text{Eq. (6):}$$

where D is given by Eq. (5) and where diag(D), for the column vector D, represents a diagonal matrix of appropriate dimensions with the elements of D along the diagonal, i.e., $\mathrm{diag}(D_1, \ldots, D_m)$ represents a diagonal matrix with $D_1, \ldots, D_m$ on the diagonal. The polynomial matrix P also contains a scalar similarity weighting factor ρ, which allows for adjustments of the degree of desired similarity based on a given sound system and listening environment. The proposed design of the similarity matrix is in general significantly different to the design suggested in [3], where identity matrices and permutations are suggested (the similarity matrix is in [3] referred to as a permutation matrix). A design according to Eq. (6) considers differences in the target transfer functions between different zones, which is not anticipated in [3]. By invoking Eq. (5) and (6), we then obtain following formulation for the last terms on the right hand side of Eq. (11) (the criterion function which is to be minimized)

$$P_1y_1 - P_2y_2 = \begin{bmatrix} D_{\Omega_1} & 0 \\ 0 & D_{\Omega_2} \end{bmatrix} y_1 - \begin{bmatrix} D_{\Omega_1} & 0 \\ 0 & D_{\Omega_2} \end{bmatrix} y_2.$$

This means that when the difference between the representations of the compensated model transfer functions of a pair of the loudspeakers, represented by $y_1$ and $y_2$, is minimized in each control point, each compensated model transfer function is multiplied with the target transfer function in each control point. The difference is thus minimized under consideration of the desired target transfer functions in each control point.

Example of the Selection of a Loudspeaker Pair and Support Loudspeakers

For the suggested method, at least one loudspeaker pair must be selected amongst the N loudspeakers. The selected pair should correspond to two of the L input signals, where the two selected inputs are used for the creation of virtual sound sources, or optionally each loudspeaker in the pair should correspond to the same mono (single signal) input. If, for example, a stereo recording shall be reproduced, then the left and right front loudspeakers define the loudspeaker pair. If, in another example, a 5.1 surround sound recording (home cinema) is to be reproduced, the left and right front loudspeakers should be primarily chosen as the loudspeaker pair. The remaining loudspeakers can then be equalized according to the proposed method by selecting further loudspeaker pairs, or by combination with other equalizers whenever desired.

Optional support loudspeakers must be carefully selected. For example, if the left front primary loudspeaker of a stereo system is fully supported by the right front loudspeaker, then both loudspeakers will reproduce both the left and right channel. This inevitably leads to a mono effect, because both loudspeakers will reproduce a very similar signal, which corresponds to the sum of the left and right channel. This mono effect can be avoided by applying either one of the following two optional design strategies: (a) Only support loudspeakers which are associated with the input channel of the primary loudspeaker are allowed. (b) The position of sound sources is typically not localizable by human hearing at low frequencies in small rooms, especially for off-center listening positions [35]. Therefore, a low-pass filter with cut-off frequency of about 180 Hz can be applied to support loudspeakers that are not associated with the primary input channel, referred to as constrained support loudspeakers. Then support loudspeakers at arbitrary positions may be used without creating a mono effect, because the sum of the left and right channel is then only reproduced by the loudspeakers for low frequencies, which will not affect the localization.

Example of Definition of Optimization Criterion

Consider the MIMO system introduced in Eq. (1)-(6) consisting of at least one loudspeaker pair. Let $n \in \{1, 2\}$ describe the two loudspeakers of the pair and recall that the total number of loudspeakers N is given by $N=N_1 \cup N_2$, where $N_1$ and $N_2$ are the number of loudspeakers used for each of the loudspeakers of the pair that are required to be similar. Note that each loudspeaker of the pair has $N_n-1$ optional support loudspeakers, and let us introduce the signals, see FIG. 11, $$z_{1n}(k)=V_n(q^{-1})(\mathcal{D}_n(q^{-1})w(k)-\mathcal{H}_n(q^{-1})u_{1n}(k))$$

$$z_{2n}(k)=W_n(q^{-1})u_{2n}(k)$$

$$y_n(k)=\mathcal{H}_{0n}(q^{-1})u_{1n}(k). \qquad \text{Eq. (7):}$$

Here, w(k) is a stationary white noise with zero-mean and covariance $E\{w^2(k)\}=\psi$. The filters $V_n(q-1)$ and $W_n(q-1)$, of dimensions M×M and $N_n \times N_n$, respectively, constitute weighting matrices for the error and control signals, respectively. Furthermore, $H_n(q-1)$ and $H_{0n}(q-1)$, both of dimension $M \times N_n$, are given by Eq. (1)-(3). The control signals $u_{1n}(k)$ and $u_{2n}(k)$, of dimension $N_n \times 1$, are given by $$\begin{aligned} u_{1n}(k) &= \mathcal{R}_{tot}(q^{-1}, q)w(k) \\ &= \tilde{\Delta}_n(q^{-1})\mathcal{F}_{n*}(q)u_{2n}(k) \\ &= \tilde{\Delta}_n(q^{-1})\mathcal{F}_{n*}(q)\mathcal{R}_n(q^{-1})w(k). \end{aligned} \qquad \text{Eq. (8)}$$

Here, $R_{tot}(q^{-1}, q)$ is a (optionally noncausal) feedforward compensator whereas $\tilde{\Delta}_n(q^{-1})$, $F_{n^*}(q^{-1})$ and $R_n(q^{-1})$ are given by $$\begin{aligned} \tilde{\Delta}_n(q^{-1}) &= \mathrm{diag}\left([q^{-(d_0-d_{1n})} \ \ldots \ q^{-(d_0-d_{N_n n})}]^T\right) \\ \mathcal{F}_n(q^{-1}) &= \mathrm{diag}\left(\left[\frac{\overline{F}_{1n}(q^{-1})}{F_{1n}(q^{-1})} \ \ldots \ \frac{\overline{F}_{N_n n}(q^{-1})}{F_{N_n n}(q^{-1})}\right]^T\right) \\ \mathcal{R}_n(q^{-1}) &= [\mathcal{R}_{1n}(q^{-1}) \ \ldots \ \mathcal{R}_{N_n n}(q^{-1})]^T. \end{aligned} \qquad \text{Eq. (9)}$$

Here, $d_0$ is the same as in Eq. (4) and represents the primary bulk delay (or smoothing lag) of the compensated system, whereas $d_{jn}$, j=1, . . . , $N_n$, are delays that can be used to compensate for individual deviations in distances among the different loudspeakers. According to [8][9], $F_{n^+}(q-1)$ in Eq. (9) is here constructed from excess phase zeros that are common among the RTFs of each of the $N_n$ loudspeakers for all measurement positions in each $\Omega_Z$. That is, the elements $B_{1jn}, \ldots, B_{Mjn}$ of the jth column of $B_n$, see Eq. (1), are assumed to share a common excess phase factor $F_j(q^{-1})$.

Since $\tilde{\Delta}_n(q^{-1})\,F_{n^+}(q)$ is fixed and known it can be regarded as a factor of an augmented system $$\bar{\mathcal{H}}_n(q^{-1}) \triangleq \mathcal{H}_n(q^{-1})\tilde{\Delta}_n(q^{-1})\mathcal{F}_{n*}(q) = \tilde{\mathcal{B}}A^{-1}, \qquad \text{Eq. (10)}$$

where $H_n(q^{-1})$ is given by Eq. (1)-(3).

Figure 11:
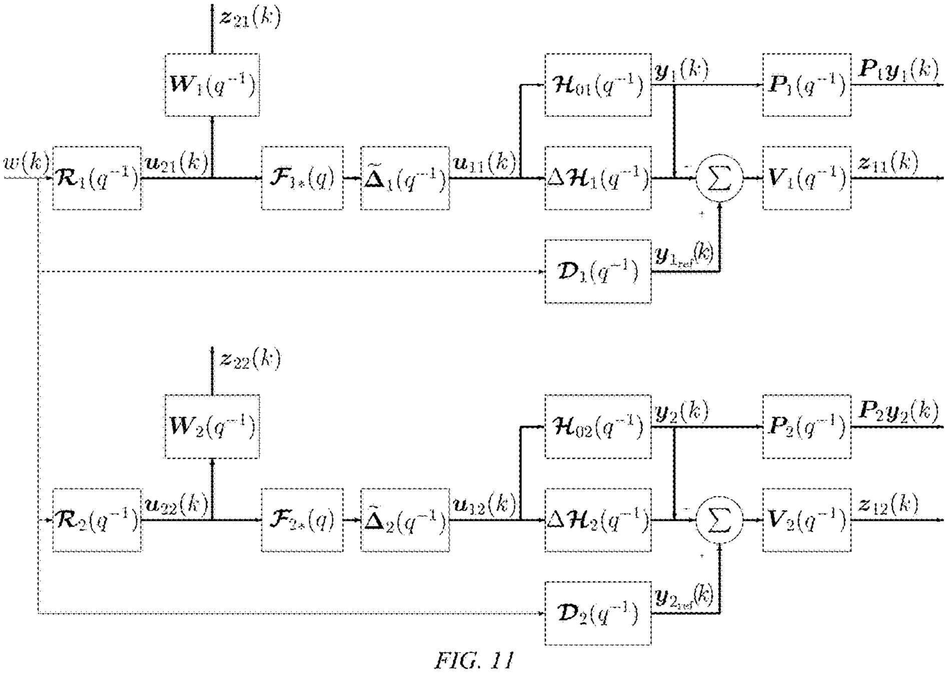
FIG. 11 describes a personal audio controller design in block diagram form according to an exemplary embodiment.

The objective is now to design the controllers $R_n(q^{-1})$ so as to attain the targets of the respective channels while making the nominal compensated channel responses, see FIG. 11, as similar as possible. In other words, the aim is to minimize the criterion $$J = \overline{E}\{tr\,E[(z_{11})(z_{11})^T]\} + tr\,E[(z_{12})(z_{12})^T] + \{tr\,E[(z_{21})(z_{21})^T]\} + \{tr\,E[(z_{22})(z_{22})^T]\} + \{tr\,E[(P_1y_1 - P_2y_2)(P_1y_1 - P_2y_2)^T]\}. \qquad \text{Eq. (11)}$$

Here $\overline{E}$ and E denote, respectively, expectation with respect to the uncertain parameters in $\Delta B_n$, see (3), and the driving noise w(k). The matrix $P_n$, of dimension M×M, constitutes a similarity matrix, which can be used to define how to minimize the third term on the right hand side of Eq. (11) with regard to the involved loudspeaker pair. Furthermore, $P_n$ constitutes a weighting matrix to regulate the control points that take similarity into account in both frequency and space.

Example of Optimal Controller Design

The criterion Eq. (11), which constitutes a squared 2-norm, or other forms of criteria, based e.g., on other norms, can be optimized in several ways with respect to the adjustable parameters of the precompensator R. It is also possible to impose structural constraints on the precompensator, such as e.g., requiring its elements to be FIR filters of certain fixed orders, and then perform optimization of the adjustable parameters under these constraints. Such optimization can be performed with adaptive techniques, or by the use of FIR Wiener filter design methods. However, as all structural constraints lead to a constrained solution space, the attainable performance will be inferior compared with problem formulations without such constraints. Hence, the optimization should preferably be performed without structural constraints on the precompensator, except for causality of the precompensator and stability of the compensated system. With the optimization problem stated as above, the problem becomes a Linear Quadratic Gaussian (LQG) design problem for the multivariable feedforward compensator R.

Linear quadratic theory provides optimal linear controllers, or precompensators, for linear systems and quadratic criteria, see e.g., [1][21][22][31]. If the involved signals are assumed to be Gaussian, then the LQG precompensator, obtained by optimizing the criterion Eq. (11) can be shown to be optimal, not only among all linear controllers but also among all nonlinear controllers, see e.g., [1]. Hence, optimizing the criterion Eq. (11) with respect to the adjustable parameters of R, under the constraint of causality of R and stability of the compensated system HR, is very general. With H and D assumed stable, stability of the compensated system, or error transfer operator, D-HR, is thus equivalent to stability of the controller R.

We will now present the LQG-optimal precompensator for the problem defined by equations Eq. (1)-(10) and the criterion Eq. (11). The solution is given in transfer operator, or transfer function form, using polynomial matrices. Techniques for deriving such solutions have been presented in e.g., [31]. Alternatively, the solution can be derived by means of state space techniques and the solution of Riccati equations, see e.g., [1][22].

Polynomial Matrix Design Equations for Optimizing Precompensators

Given the system $\tilde{H}(q^{-1})$ above, with the fixed and known delay polynomial matrix $\tilde{\Delta}_n(q^{-1})$, the all-pass rational matrix $F_{n^+}(q)$, and assuming the signal w(k) being a zero mean unit variance white noise sequence, the optimal linear-quadratic-Gaussian (LQG) precompensator $R(q^{-1})$, free of preringing artifacts, which minimizes the criterion Eq. (11) under the constraint of causality and stability, is obtained as, $$\mathcal{R} = A\beta^{-1}Q\frac{1}{E} \qquad \text{Eq. (12)}$$

where β, of dimension $(N_1+N_2)\times(N_1+N_2)$, is the unique (up to a unitary constant matrix) stable spectral factor given by $$\beta_*\beta = \overline{E}\{\tilde{B}_*V_*V\tilde{B} + A_*W_*WA + \check{B}_{0*}P_*P\check{B}_0\} \qquad \text{Eq. (13):}$$

with $\tilde{\beta}(q^{-1})$, of dimension $2M\times(N_1+N_2)$, being as in Eq. (10). $\check{B}_0(q^{-1})$ in Eq. (13) is given by invoking Eq. (10) and (2.2)

$$\tilde{B} = \check{B}_0 + \Delta B\check{B}_1 = (\hat{B}_0 + \Delta B\hat{B}_1)\tilde{\Delta}F_* = B\tilde{\Delta}\mathcal{F}_*.$$

Note here that the scalar weighting factor ρ is included in P, such that $\rho^2$ scales the similarity term in Eq. (13) with respect to the target requirement. The polynomial matrix Q, together with a polynomial matrix $L_]$, both of dimension $(N_1+N_2)\times 1$, constitute the unique solution to the Diophantine equation $$\tilde{B} = (\hat{B} + \Delta B\hat{B})\tilde{\Delta}\mathcal{F}_*. \qquad \text{Eq. (14):}$$

with generic degrees $$\deg Q = \max(\deg V + \deg D,\ \deg E - 1)$$

$$\deg L_* = \max(\deg \tilde{E}\{\tilde{\tilde{B}}_{0*}\} + \deg V_*, \deg \beta_*) - 1. \qquad \text{Eq. (15):}$$

Example of Postprocessing for Spectral Smoothness

When a sound system is reproducing music, it is mostly preferable that the magnitude spectrum of the system's transfer functions is smooth and well balanced, at least on average over the listening zones. If the compensated system perfectly attains the desired target D and similarity at all positions, then the average magnitude response of the compensated system will be as desired. However, since the designed controller R cannot be expected to fully reach the target response D and similarity at all frequencies, e.g., due to very complex room reverberation that cannot be fully compensated for, there will always be some remaining approximation errors in the compensated system. These approximation errors may have different magnitude at different frequencies, and they may affect the quality of the reproduced sound. Magnitude response imperfections are generally undesirable and the controller matrix should preferably be adjusted so that an overall target magnitude response is reached on average in all the listening zones.

A final design step is therefore preferably added after the criterion minimization with the aim of adjusting the controller response so that, on average, a target magnitude response is well approximated on average over the measurement positions. To this end, the magnitude responses of the overall system (i.e., the system including the controller R) can be evaluated in the various listening positions, based on the design models or based on new measurements. A minimum phase filter can then be designed so that on average (in the root mean square (RMS) sense) the target magnitude response is reached in all listening regions. As an example, variable fractional octave smoothing based on the spatial response variations may be employed in order not to overcompensate in any particular frequency region. The result is one scalar equalizer filter that adjusts all the elements of R by an equal amount.

An Illustrative Example

We shall now present results of an evaluation based on real measurements acquired in the two front seats of a four channel automotive sound system, which consists of four broadband loudspeakers, which are located in the doors. The car used is a Ford Mondeo sedan, where all loudspeakers are part of the delivered standard sound system. An automotive after-market amplifier was fitted in order to have access to the channels and bypass the head unit. This sound system corresponds to a typical standard automotive sound system.

Figure 12:
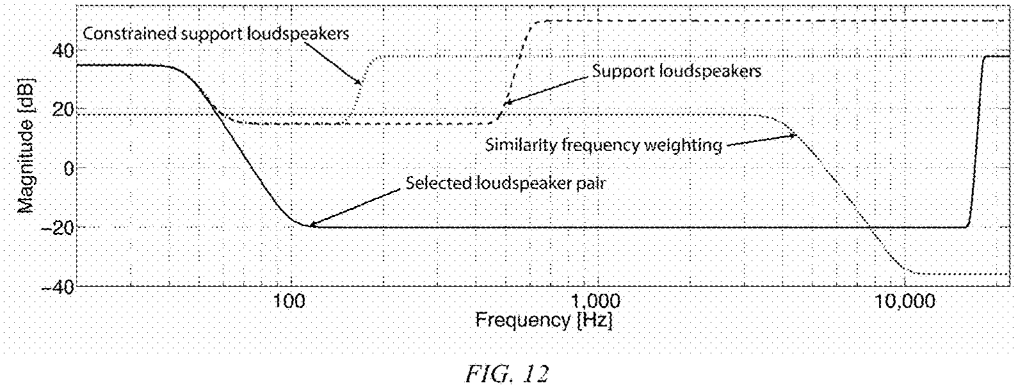
FIG. 12 depicts the applied frequency weighting in an illustrative example.

In this filter design, the matrix V contains identity matrices of appropriate dimensions. Hence we will not use any frequency weighting of the target error. The matrix W contains frequency weightings, which penalize the control actions so that the involved loudspeakers are not driven outside their operating ranges. Furthermore, this weighting matrix also controls the operating frequency range of the support loudspeakers, e.g., by limiting their impact to lower frequencies. We here make use of all available loudspeakers as support loudspeakers, with the following confinement: Support loudspeakers associated with the other input signals than the considered loudspeaker of the chosen pair are only used up to 180 Hz, see the fine dotted line in FIG. 12.

The similarity matrix P also contains a frequency weighting, preferably used to focus the similarity efforts to lower frequencies. The weighting consists of a shelving filter with a cut-off frequency of 4 kHz, see FIG. 12. This is motivated by the fact that phase shifts are assumed to be audible up to about 5 kHz. The scalar similarity weighting factor is set to $\rho^2=0.3$.

Figure 13:
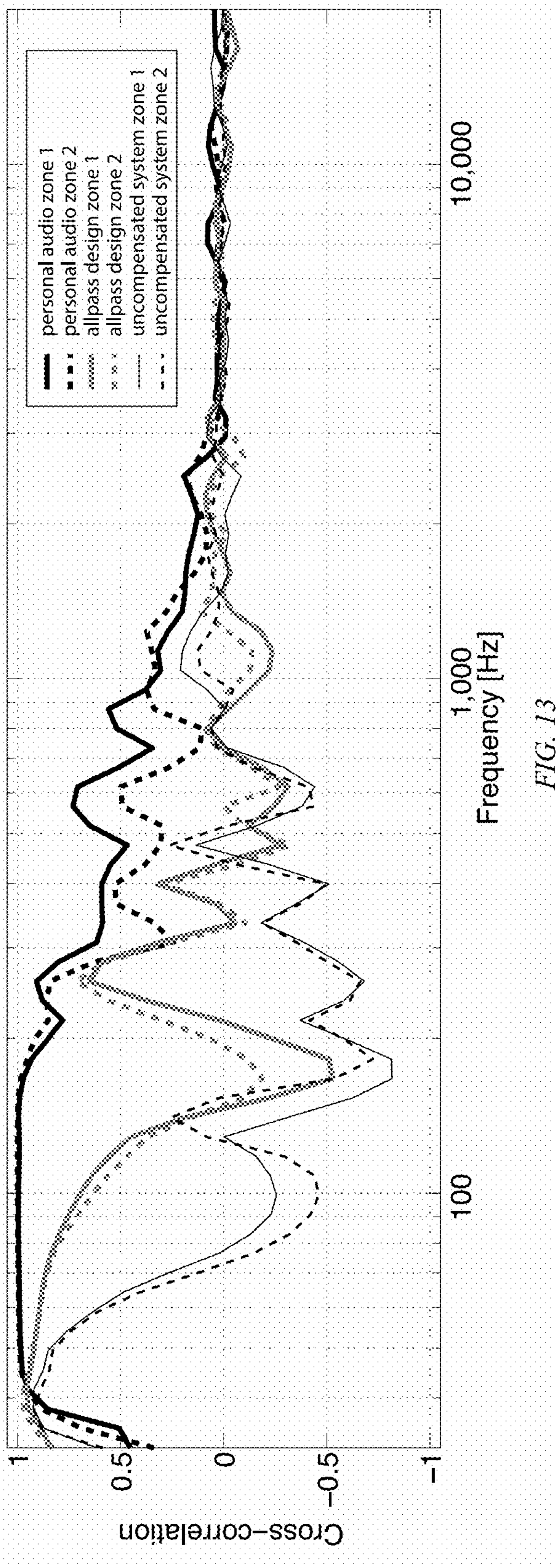
FIG. 13 illustrates a design example. Shown is the average cross-correlation between two loudspeakers, left and right, of a four channel car sound system, evaluated in 48 control points in each of the two front seats, for different precompensation methods and the uncompensated system.

In order to assess the spatial performance of the compared methods under reverberant conditions, we shall use a cross-correlation measure, which evaluates the cross-correlation between the loudspeakers in the loudspeaker pair, which creates virtual sources, in narrow frequency bands. FIG. 13, which depicts the average cross-correlation over all control points in a zone, can be interpreted considering two basic rules: (1) The higher the cross-correlation at a given center frequency is, that is, the closer to 1, the more equal the RTFs would be on average in the corresponding frequency band, resulting in a better spatial reproduction of virtual sources in that frequency band; (2) The broader the frequency range with high cross-correlation, the better the overall spatial reproduction.

FIG. 13 directly compares the average cross-correlation in the two zones of (a) The system compensated with the proposed method, depicted by thick solid and dashed black lines in FIG. 13, (b) The system compensated with the allpass filter design suggested in previous work, depicted by thick solid and dashed grey lines in FIG. 13, (c) The uncompensated system, depicted by thin solid and dashed black lines in FIG. 13. The allpass design yields a significant improvement of the uncompensated system. However, as argued before, such allpass designs are based on crude simplifications and are not well suited to compensate real audio systems, especially not in challenging acoustic environments such as cars. Instead, a filter design that aims at spatial fidelity in several zones should take the given acoustic environment into account. Such a method, which is based on target transfer functions instead of direct design of the filters' phase responses, is proposed here and we conclude by inspection of FIG. 13, that the suggested personal audio framework significantly improves the spatial sound reproduction, because it obtains high cross-correlation over a wide frequency range. Furthermore, the personal audio filter design obtains both high cross-correlation and equal performance in the two zones up to 250 Hz. Between 250-3000 Hz, the allpass filter design obtains more equal performance in the two zones than the personal audio filter. However, the cross-correlation is at these frequencies very low for the allpass filter design (see the thick grey solid and dashed lines) and the performance is thus equally poor in both zones. In contrast, the personal audio filter design obtains high cross-correlation in both zones up to 3000 Hz, see the thick solid and dashed black lines in FIG. 13. These results strongly suggest that the proposed method is superior in performance to previously reported methods.

Implementation Aspects

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g., discrete logic gates interconnected to perform a specialized function, or Application Specific Integrated Circuits (ASICs).

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g., by reprogramming of the existing software or by adding new software components.

According to a second aspect, there is provided a system configured to determine filter coefficients of an audio precompensation controller for the compensation of an associated sound system. The sound system comprises N≥2 loudspeakers. The system is configured to estimate, for each one of at least a pair of the loudspeakers, a model transfer function at each of a plurality M of control points distributed in Z≥2 spatially separated listening zones in a listening environment of the sound system based on a model of acoustic properties of the listening environment. The system is also configured to determine, for each of the M control points, a zone-dependent target transfer function at least based on the zone affiliation of the control point and the model of acoustic properties. The system is further configured to determine the filter coefficients of the audio precompensation controller at least based on the model transfer functions and the target transfer functions of the M control points.

By way of example, the system may be configured to determine the filter coefficients based on optimizing a criterion function, where the criterion function at least comprises a target error related to the model transfer functions and the target transfer functions and optionally also differences between representations of compensated model transfer functions of at least a pair of the loudspeakers.

For example, the system may be configured to operate based on model transfer functions and target transfer functions that are representing impulse responses at the control points.

In a particular example, the system is configured to determine model transfer functions that are acoustically unsymmetrical for both symmetrical and unsymmetrical setups in relation to the position of the loudspeakers and the listening zones.

As an example, the system may be configured to determine the target transfer function in each control point based on phase differences between at least a pair of the loudspeakers in the control point. The phase differences may for example be defined by the model transfer function(s) in the control point, and the phase characteristics of said zone-dependent target transfer functions normally differ between control points affiliated with different listening zones.

In one example, the system may be configured to estimate a model transfer function at each of the control points based on estimating an impulse response at each of the control points, based on sound measurements of the sound system.

In another example, the system is configured to estimate a model transfer function at each of the control points based on a simulation of an impulse response at each of the control points, wherein the simulation includes first order reflections and/or higher order reflections.

Optionally, the system may be configured to determine the filter coefficients based on optimizing a criterion function under the constraint of stability of the dynamics of the audio precompensation controller. For example, the criterion function may at least include a weighted summation of powers of differences between compensated model impulse responses and target impulse response over the M control points, and optionally a weighted summation of powers of differences between representations of compensated model transfer functions of at least a pair of the loudspeakers.

By way of example, as illustrated in the overview of FIG. 1, the audio precompensation controller may have L inputs for L controller input signals and N outputs for N controller output signals, one to each loudspeaker of the sound system, wherein at least one of the loudspeaker pairs is specified for the input signals.

In a particular example, the system comprises a processor and a memory. The memory comprises instructions executable by the processor, whereby the processor is operative to determine the filter coefficients of the audio precompensation controller.

Figure 14:
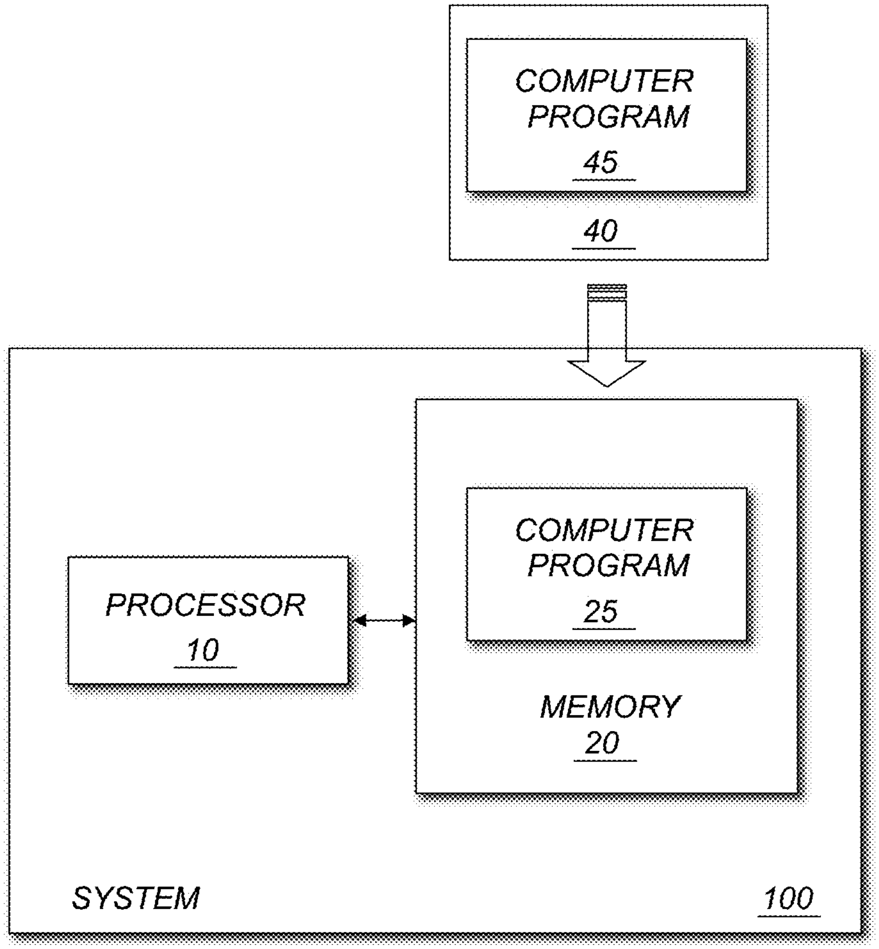
FIG. 14 is a schematic block diagram illustrating an example of a system for determining an audio precompensation controller according to an exemplary embodiment.

FIG. 14 is a schematic block diagram illustrating an example of such a system 100 comprising a processor 10 and an associated memory 20.

In this particular example, at least some of the steps, functions, procedures, modules and/or blocks described herein are implemented in a computer program 25; 45, which is loaded into the memory 20 for execution by processing circuitry including one or more processors. The processor(s) 10 and memory 20 are interconnected to each other to enable normal software execution. An optional input/output device may also be interconnected to the processor(s) 10 and/or the memory 20 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

In a particular embodiment, the computer program comprises instructions, which when executed by at least one processor, cause the processor(s) to:

- estimate, for each one of at least a pair of the loudspeakers, a model transfer function at each of a plurality M of control points distributed in Z≥2 spatially separated listening zones in a listening environment of the sound system;
- determine, for each of said M control points, a zone-dependent target transfer function at least based on the zone affiliation of the control point; and
- determine the filter coefficients of the audio precompensation controller at least based on the model transfer functions and the target transfer functions of the M control points.

The proposed technology also provides a carrier 20; 40 comprising the computer program 25; 45, wherein the carrier is one of an electronic signal, an optical signal, an electromagnetic signal, a magnetic signal, an electric signal, a radio signal, a microwave signal, or a computer-readable storage medium.

By way of example, the software or computer program 25; 45 may be realized as a computer program product, which is normally carried or stored on a computer-readable medium 20; 40, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may therefore be regarded as a computer flow diagram or diagrams, when performed by one or more processors. A-corresponding apparatus may be defined as a group of function modules, where each step performed by the processor corresponds to a function module. In this case, the function modules are implemented as a computer program running on the processor. Hence, the system or apparatus for filter design may alternatively be defined as a group of function modules, where the function modules are implemented as a computer program running on at least one processor.

The computer program residing in memory may thus be organized as appropriate function modules configured to perform, when executed by the processor, at least part of the steps and/or tasks described herein.

Figure 15:
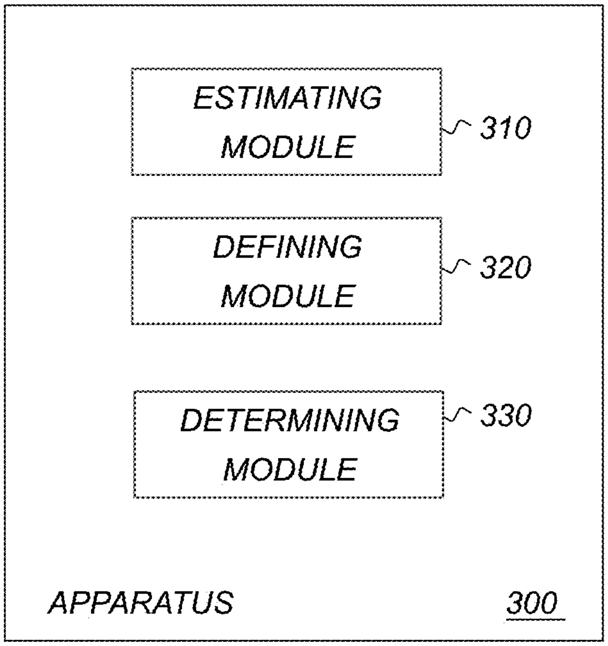
FIG. 15 is a schematic block diagram illustrating an example of an apparatus for determining filter coefficients of an audio precompensation controller for the compensation of an associated sound system.

FIG. 15 is a schematic block diagram illustrating an example of an apparatus for determining filter coefficients of an audio precompensation controller for the compensation of an associated sound system. The associated sound system comprises N≥2 loudspeakers. The apparatus 300 comprises an estimating module 310 for estimating, for each one of at least a pair of the loudspeakers, a model transfer function at each of a plurality M of control points distributed in Z≥2 spatially separated listening zones in a listening environment of the sound system. The apparatus 300 also comprises a defining module 320 for defining, for each of the M control points, a zone-dependent target transfer function at least based on the zone affiliation of the control point. The apparatus 300 further comprises a determining module 330 for determining the filter coefficients of the audio precompensation controller at least based on the model transfer functions and the target transfer functions of the M control points.

Alternatively it is possibly to realize the modules in FIG. 15 predominantly by hardware modules, or alternatively by hardware. The extent of software versus hardware is purely implementation selection.

Typically, the design equations are solved on a separate computer system to produce the filter parameters of the precompensation filter. The calculated filter parameters are then normally downloaded into a digital filter, for example, realized by a digital signal processing system or similar computer system, such as, e.g., smartphones, tablets, laptop computers, which executes the actual filtering.

Although the invention can be implemented in software, hardware, firmware or any combination thereof, the filter design scheme proposed by the invention is preferably implemented as software in the form of program modules, functions or equivalent. The software may be written in any type of computer language, such as C, C++ or even specialized languages for digital signal processors (DSPs). In practice, the relevant steps, functions and actions of the invention are mapped into a computer program, which when being executed by the computer system effectuates the calculations associated with the design of the precompensation filter. In the case of a PC-based system, the computer program used for the design of the audio precompensation filter is normally encoded on a computer-readable medium such as a DVD, CD, USB flash drive, or similar structure for distribution to the user/filter designer, who then may load the program into his/her computer system for subsequent execution. The software may even be downloaded from a remote server via the Internet.

Figure 16:
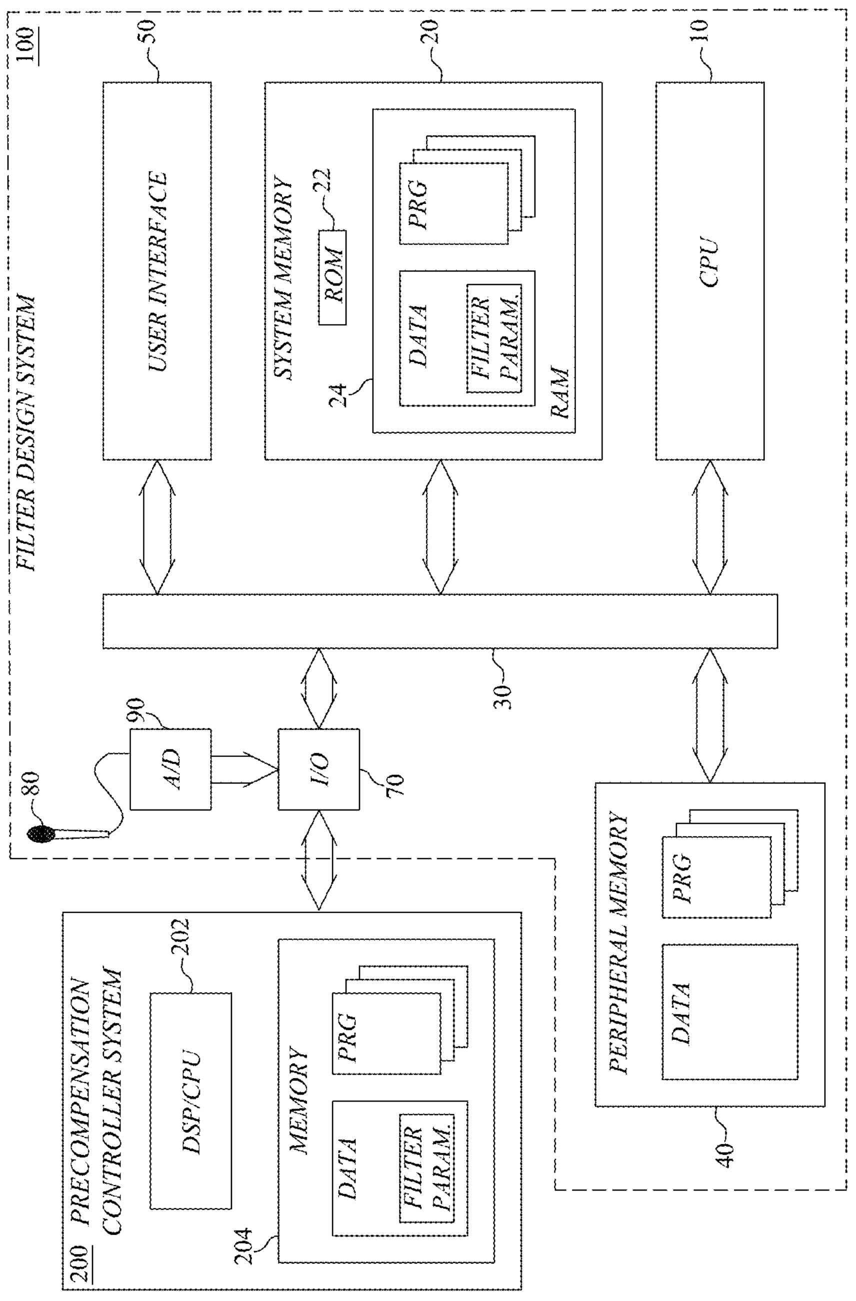
FIG. 16 is a schematic block diagram of an example of a computer-based system suitable for implementation of the invention.

FIG. 16 is a schematic block diagram illustrating an example of a computer system suitable for implementation of a filter design algorithm according to the invention. The system 100 may be realized in the form of any conventional computer system, including personal computers (PCs), mainframe computers, multiprocessor systems, network PCs, digital signal processors (DSPs), and the like. Anyway, the system 100 basically comprises a central processing unit (CPU) or digital signal processor (DSP) core(s) 10, a system memory 20 and a system bus 30 that interconnects the various system components. The system memory 20 typically includes a read only memory (ROM) 22 and a random access memory (RAM) 24. Furthermore, the system 100 normally comprises one or more driver-controlled peripheral memory devices 40, such as, e.g., hard disks, magnetic disks, optical disks, floppy disks, digital video disks or memory cards, providing non-volatile storage of data and program information. Each peripheral memory device 40 is normally associated with a memory drive for controlling the memory device as well as a drive interface (not illustrated) for connecting the memory device 40 to the system bus 30. A filter design program implementing a design algorithm according to the invention, possibly together with other relevant program modules, may be stored in the peripheral memory 40 and loaded into the RAM 22 of the system memory 20 for execution by the CPU 10. Given the relevant input data, such as a model representation and other optional configurations, the filter design program calculates the filter parameters of the precompensation filter.

The determined filter parameters are then normally transferred from the RAM 24 in the system memory 20 via an I/O interface 70 of the system 100 to a precompensation controller, also referred to as a precompensation filter system 200. Preferably, the precompensation controller or filter system 200 is based on a digital signal processor (DSP) or similar central processing unit (CPU) 202, or equivalent processor, and one or more memory modules 204 for holding the filter parameters and the required delayed signal samples. The memory 204 normally also includes a filtering program, which when executed by the processor 202, performs the actual filtering based on the filter parameters.

Instead of transferring the calculated filter parameters directly to a precompensation controller or filter system 200 via the I/O system 70, the filter parameters may be stored on a peripheral memory card or memory disk 40 for later distribution to a precompensation controller or filter system, which may or may not be remotely located from the filter design system 100. The calculated filter parameters may also be downloaded from a remote location, e.g. via the Internet, and then preferably in encrypted form.

In order to enable measurements of sound produced by the audio equipment under consideration, any conventional microphone unit(s) or similar recording equipment 80 may be connected to the computer system 100, typically via an analog-to-digital (A/D) converter 80. Based on measurements of (conventional) audio test signals made by the microphone 80 unit, the system 100 can develop a model of the audio system, using an application program loaded into the system memory 20. The measurements may also be used to evaluate the performance of the combined system of precompensation filter and audio equipment. If the designer is not satisfied with the resulting design, he may initiate a new optimization of the precompensation filter based on a modified set of design parameters.

Furthermore, the system 100 typically has a user interface 50 for allowing user-interaction with the filter designer. Several different user-interaction scenarios are possible.

For example, the filter designer may decide that he/she wants to use a specific, customized set of design parameters in the calculation of the filter parameters of the controller or filter system 200. The filter designer then defines the relevant design parameters via the user interface 50.

It is also possible for the filter designer to select between a set of different preconfigured parameters, which may have been designed for different audio systems, listening environments and/or for the purpose of introducing special characteristics into the resulting sound. In such a case, the preconfigured options are normally stored in the peripheral memory 40 and loaded into the system memory during execution of the filter design program.

The filter designer may also define the model transfer functions by using the user interface 50. Instead of determining a system model based on microphone measurements, it is also possible for the filter designer to select a model of the audio system from a set of different preconfigured system models. Preferably, such a selection is based on the particular audio equipment with which the resulting precompensation filter is to be used.

Preferably, the audio filter is embodied together with the sound generating system so as to enable generation of sound influenced by the filter.

In an alternative implementation, the filter design is performed more or less autonomously with no or only marginal user participation. An example of such a construction will now be described. The exemplary system comprises a supervisory program, system identification software and filter design software. Preferably, the supervisory program first generates test signals and measures the resulting acoustic response of the audio system. Based on the test signals and the obtained measurements, the system identification software determines a model of the audio system. The supervisory program then gathers and/or generates the required design parameters and forwards these design parameters to the filter design program, which calculates the precompensation filter parameters. The supervisory program may then, as an option, evaluate the performance of the resulting design on the measured signal and, if necessary, order the filter design program to determine a new set of filter parameters based on a modified set of design parameters. This procedure may be repeated until a satisfactory result is obtained. Then, the final set of filter parameters are downloaded/implemented into the precompensation controller or filter system.

It is also possible to adjust the filter parameters of the precompensation filter adaptively, instead of using a fixed set of filter parameters. During the use of the filter in an audio system, the audio conditions may change. For example, the position of the loudspeakers and/or objects such as furniture in the listening environment may change, which in turn may affect the room acoustics, and/or some equipment in the audio system may be exchanged by some other equipment leading to different characteristics of the overall audio system. In such a case, continuous or intermittent measurements of the sound from the audio system in one or several positions in the listening environment may be performed by one or more microphone units or similar sound recording equipment. The recorded sound data may then be fed into a filter design system, such as system 100 of FIG. 16, which calculates a new audio system model and adjusts the filter parameters so that they are better adapted for the new audio conditions.

Naturally, the invention is not limited to the arrangement of FIG. 16. As an alternative, the design of the precompensation filter and the actual implementation of the filter may both be performed in one and the same computer system 100 or 200. This generally means that the filter design program and the filtering program are implemented and executed on the same DSP or microprocessor system.

Figure 17:
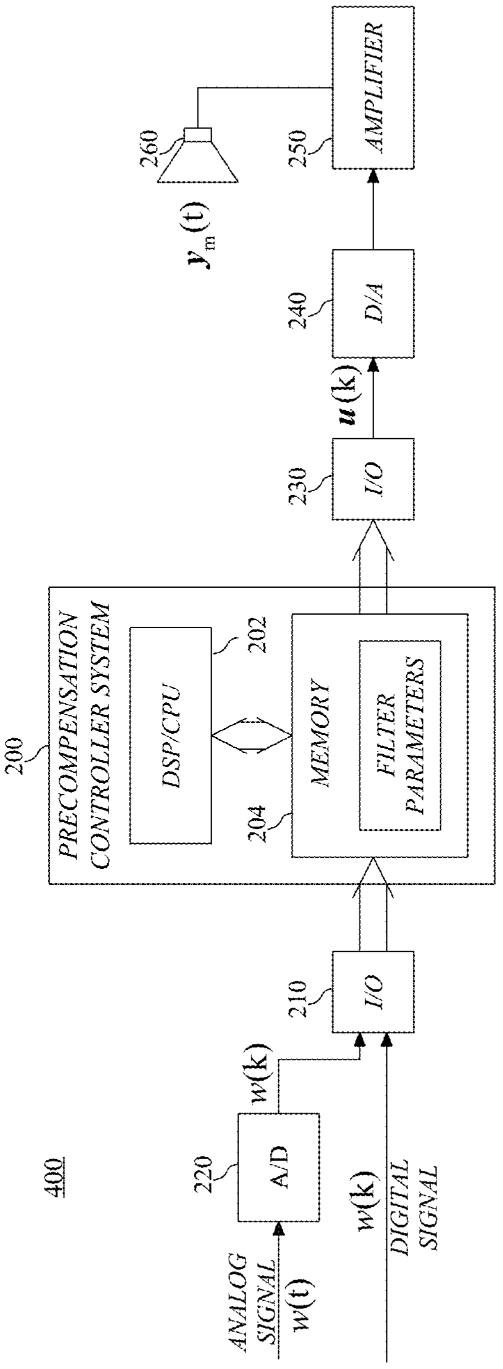
FIG. 17 schematically illustrates a sound generating or reproducing system incorporating a precompensation controller or filter system according to the present invention.

A sound generating or reproducing system 400 incorporating a precompensation controller or filter system 200 according to the present invention is schematically illustrated in FIG. 17. A vector w(t) of audio signals from a sound source is forwarded to a precompensation controller or filter system 200, possibly via a conventional I/O interface 210. If the audio signals w(t) are analog, such as for LPs, analog audio cassette tapes and other analog sound sources, the signal is first digitized in an A/D converter 210 before entering the filter 200. Digital audio signals from, e.g., CDs, DAT tapes, DVDs, mini discs, and so forth may be forwarded directly to the filter 200 without any conversion.

The digital or digitized input signal w(k) is then precompensated by the precompensation filter 200, basically to take the effects of the subsequent audio system equipment into account.

The resulting compensated signal u(k) is then forwarded, possibly through a further I/O unit 230, for example, via a wireless link, to a D/A-converter 240, in which the digital compensated signal u(k) is converted to a corresponding analog signal. This analog signal then enters an amplifier 250 and a loudspeaker 260. The sound signal $y_m(t)$ emanating from the set of N loudspeaker 260 then has the desired audio characteristics, giving a close to ideal sound experience. This means that any unwanted effects of the audio system equipment have been eliminated through the inverting action of the precompensation filter.

The precompensation controller or filter system may be realized as a standalone equipment in a digital signal processor or computer that has an analog or digital interface to the subsequent amplifiers, as mentioned above. Alternatively, it may be integrated into the construction of a digital preamplifier, a D/A converter, a computer sound card, a compact stereo system, a home cinema system, a computer game console, a TV, an MP3 player docking station, a smartphone, a tablet, a laptop computer, or any other device or system aimed at producing sound. It is also possible to realize the precompensation filter in a more hardware-oriented manner, with customized computational hardware structures, such as FPGAs or ASICs.

It should be understood that the precompensation may be performed separate from the distribution of the sound signal to the actual place of reproduction. The precompensation signal generated by the precompensation filter does not necessarily have to be distributed immediately to and in direct connection with the sound generating system, but may be recorded on a separate medium for later distribution to the sound generating system. The compensation signal u(k) in FIG. 17 could then represent, for example, recorded music on a CD or DVD disk that has been adjusted to a particular audio equipment and listening environment. It can also be a precompensated audio file stored on an Internet server for allowing subsequent downloading or streaming of the file to a remote location over the Internet.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

REFERENCES

[1] B. D. O. ANDERSON AND J. B. MOORE. OPTIMAL CONTROL, LINEAR QUADRATIC METHODS. PRENTICE-HALL, ENGLEWOOD CLIFFS, N.J., 1990.

[2] M. ARLBRANT. SOUND QUALITY ENHANCEMENT OF AUTOMOTIVE AUDIO SYSTEMS. MASTER'S THESIS, CHALMERS UNIVERSITY OF TECHNOLOGY, SWEDEN, 2009.

[3] A. BAHNE, L.-J. BRÄNNMARK AND A. AHLÉN. AUDIO PRECOMPENSATION CONTROLLER DESIGN WITH PAIRWISE LOUDSPEAKER CHANNEL SIMILARITY, January 2014, WO PATENT APP. PCT/SE2013/050,748

[4] J. BAUCK AND D. H. COOPER. GENERALIZED TRANSAURAL STEREO AND APPLICATIONS. J. AUDIO ENG. SOC., 44(9):683-705, September 1996.

[5] J. BLAUERT. SPATIAL HEARING—REVISED EDITION: THE PSYCHOPHYSICS OF HUMAN SOUND LOCALIZATION. THE MIT PRESS, 1996.

[6] L.-J. BRÄNNMARK. ROBUST AUDIO PRECOMPENSATION WITH PROBABILISTIC MODELING OF TRANSFER FUNCTION VARIABILITY. IN IEEE WORKSHOP ON APPLICATIONS OF SIGNAL PROCESSING TO AUDIO AND ACOUSTICS, WASPAA'09, PROCEEDINGS, PAGES 193-196, NEW PALTZ, N.Y., October 2009.

[7] L. J. BRÄNNMARK, M. STERNAD AND M. JOHANSSON. SOUND FIELD CONTROL IN MULTIPLE LISTENING REGIONS, July 2013, U.S. Pat. No. 8,213,637

[8] L.-J. BRÄNNMARK, A. BAHNE, AND A. AHLÉN. COMPENSATION OF LOUDSPEAKER-ROOM RESPONSES USING MIMO FEEDFORWARD CONTROL. IEEE TRANSACTIONS ON AUDIO, SPEECH, AND LANGUAGE PROCESSING, 21(6):1201-1216, 2013.

[9] L.-J. BRÄNNMARK AND A. AHLÉN. SPATIALLY ROBUST AUDIO COMPENSATION BASED ON SIMO FEED-FORWARD CONTROL. IEEE TRANSACTIONS ON SIGNAL PROCESSING, 57(5), May 2009.

[10] M. CHRISTOPH AND L. SCHOLZ. AUDIO SYSTEM PHASE EQUALIZATION, May 2011, U.S. patent application Ser. No. 12/917,604

[11] D. CLARK. STEREO IN AUTOMOBILES. IN AES 8TH INT. CONF.: THE SOUND OF AUDIO, WASHINGTON D.C., USA, May 1990.

[12] B. A. COOK AND M. J. SMITHERS. STEREOPHONIC SOUND IMAGING, September 2007, WO PATENT APP. PCT/US2007/006,520

[13] F. ALTON EVEREST. MASTER HANDBOOK OF ACOUSTICS. MCGRAW-HILL, 4TH EDITION, 2001.

[14] H. FASTL AND E. ZWICKER. PSYCHOACOUSTICS. SPRINGER, 3RD EDITION, 2007.

[15] M. FRANK, F. ZOTTER, H. WIERSTORF, AND S. SPORS. SPATIAL AUDIO RENDERING. IN, S. MOLLER AND A. RAAKE, EDITORS, QUALITY OF EXPERIENCE, T-LABS SERIES IN TELECOMMUNICATION SERVICES, PAGES 247-260. SPRINGER INTERNATIONAL PUBLISHING, 2014.

[16] H. I. GEFVERT. MULTI-PURPOSE INTERCHANGEABLE MODULAR AUTO LOUDSPEAKER SYSTEM, February 1985. U.S. Pat. No. 4,502,149.

[17] A. GRIMANI. A STEREOPHONIC IMAGING SYSTEM FOR CAR AUDIO. PRESENTED AT AES 91ST CONV., NEW YORK, N.Y., USA. PREPRINT 3190, October 1991.

[18] T. KAILATH. LINEAR SYSTEMS. PRENTICE-HALL, ENGLEWOOD CLIFFS, N.J., 1980.

[19] H. KIHARA, H. BINAURAL CORRELATION COEFFICIENT CORRECTING APPARATUS, March 1989, U.S. Pat. No. 4,817,162

[20] D. KIM, AND Y. SEO. THREE-DIMENSIONAL SOUND REPRODUCING APPARATUS FOR MULTIPLE LISTENERS AND METHOD THEREOF, June 2003, U.S. Pat. No. 6,574,339

[21] V. KUČERA. ANALYSIS AND DESIGN OF DISCRETE LINEAR CONTROL SYSTEMS. ACADEMIA, PRAGUE, 1991.

[22] H. KWAKERNAAK AND R. SIVAN. LINEAR OPTIMAL CONTROL SYSTEMS. WILEY, NEW YORK, 1972.

[23] H. LAHTI. DOLBY SURROUND SYSTEMS IN CARS. IN AES 15TH INT. CONF.: AUDIO, ACOUSTICS & SMALL SPACES, COPENHAGEN, DENMARK, October 1998.

[24] MATSUO, O. STEREO PROCESSING SYSTEM, March 1990, U.S. Pat. No. 4,908,858

[25] D. MOORE AND J. WAKEFIELD. OPTIMIZATION OF THE LOCALIZATION PERFORMANCE OF IRREGULAR AMBISONIC DECODERS FOR MULTIPLE OFF-CENTER LISTENERS. PRESENTED AT AES 128TH CONV., LONDON, UK. CONV. PAPER 8061, May 2010.

[26] K. ÖHRN, A. AHLÉN, AND M. STERNAD. A PROBABILISTIC APPROACH TO MULTIVARIABLE ROBUST FILTERING AND OPEN-LOOP CONTROL. IEEE TRANSACTIONS ON AUTOMATIC CONTROL, 40(3):405-418, March 1995.

[27] M. L. PETROFF. DIGITAL SIGNAL PROCESSING FOR SYMMETRICAL STEREOPHONIC IMAGING IN AUTOMOBILES, April 2005. U.S. Pat. No. 6,876,748.

[28] R. RABENSTEIN AND S. SPORS. SOUND FIELD REPRODUCTION. IN J. BENESTY, M. M. SONDHI, AND Y.(A.) HUANG, EDITORS, SPRINGER HANDBOOK OF SPEECH PROCESSING, PAGES 1095-1114. SPRINGER BERLIN HEIDELBERG, 2008.

[29] K. SADAIE. STEREOPHONIC REPRODUCTION SYSTEM, July 1991. U.S. Pat. No. 5,033,092.

[30] M. J. SMITHERS. IMPROVED STEREO IMAGING IN AUTOMOBILES. PRESENTED AT AES 123TH CONV., NEW YORK, N.Y., USA. CONV. PAPER 7223, October 2007.

[31] M. STERNAD AND A. AHLÉN. LQ CONTROLLER DESIGN AND SELF-TUNING CONTROL. IN K. HUNT, EDITOR, POLYNOMIAL METHODS IN OPTIMAL CONTROL AND FILTERING, PAGES 56-92. PETER PEREGRINUS, LONDON, UK, 1993.

[32] M. STERNAD AND A. AHLÉN. ROBUST FILTERING AND FEEDFORWARD CONTROL BASED ON PROBABILISTIC DESCRIPTIONS OF MODEL ERRORS. AUTOMATICA, 29(3):661-679, 1993.

[33] F. B. THIGPEN. VEHICLE AUDIO SYSTEM WITH DIRECTIONAL SOUND AND REFLECTED AUDIO IMAGING FOR CREATING A PERSONAL SOUND STAGE, March 2008. U.S. Pat. No. 7,343,020.

[34] F. E. TOOLE. SOUND REPRODUCTION. FOCAL PRESS, 2008.

[35] D. GRIESINGER. SPATIAL IMPRESSION AND ENVELOPMENT IN SMALL ROOMS. PRESENTED AT AES 103RD CONV., NEW YORK, N.Y., USA. PREPRINT 4638, September 1997.

The invention claimed is:

1. A method for determining filter coefficients of an audio precompensation controller for compensation of an associated sound system including N≥2 loudspeakers, the audio precompensation controller being implemented as an audio filter, the method comprising:

estimating, for each one of at least a pair of said loudspeakers, a model transfer function at each of a plurality M of measurement points that are control points, distributed in Z≥2 spatially separated listening zones in a listening environment of said sound system, the model transfer function representing sound propagation from the loudspeaker to the respective control point as a model impulse response;

determining, for each of said M control points, a zone-dependent target transfer function, representing a target impulse response, at least based on a zone affiliation of the control point, said zone-dependent target transfer function in each control point being determined based on phase differences between at least a pair of said loudspeakers in said control point, said phase differences being defined by at least one of the model transfer functions in said control point, phase characteristics of said zone-dependent target transfer functions differing between control points affiliated with different listening zones;

determining said filter coefficients of said audio precompensation controller at least based on said model transfer functions and said target transfer functions of said M control points; and implementing parameters of the audio filter based on the determined filter coefficients, the audio filter and the sound system together enabling generation of sound influenced by the audio filter.

2. The method of claim 1, wherein the filter coefficients are determined based on optimizing a criterion function, said criterion function at least comprising a target error related to said model transfer functions and said target transfer functions.

3. The method of claim 1, wherein said model transfer functions are acoustically unsymmetrical for both symmetrical and unsymmetrical setups in relation to the position of said loudspeakers and said listening zones.

4. The method of claim 1, wherein said estimating a model transfer function at each of a plurality M of control points is based on estimating a sound measurement impulse response at each of said control points, based on sound measurements of said sound system, or based on simulation of a simulated impulse response at each of said control points, said simulation including first order reflections and/or higher order reflections.

5. The method of claim 1, wherein the filter coefficients are determined based on optimizing a criterion function under the constraint of stability of the dynamics of said audio precompensation controller, said criterion function at least including a weighted summation of powers of differences between compensated model impulse responses and the target impulse responses over said M control points.

6. The method of claim 1, further comprising merging said filter coefficients, determined for said Z listening zones, into a merged set of filter parameters for said audio precompensation controller.

7. An audio precompensation controller apparatus for compensation of an the associated sound system, wherein the audio precompensation controller apparatus is implemented as the audio filter, the audio filter and the sound system for generating sound influenced by the audio filter, wherein the filter coefficients are determined by using the method of claim 1.

8. An audio system comprising the sound system and the audio precompensation controller in the input path to said sound system, wherein said audio precompensation controller is determined by using the method of claim 1.

9. The method of claim 2, wherein the criterion function additionally comprises differences between representations of compensated model transfer functions of at least a pair of said loudspeakers.

10. The method of claim 5, wherein the criterion function further includes a weighted summation of powers of differences between representations of compensated model transfer functions of at least a pair of said loudspeakers.

11. A system configured to determine filter coefficients of an audio precompensation controller for compensation of an associated sound system including N≥2 loudspeakers, the audio precompensation controller being implemented as an audio filter, the filter coefficient determining system comprising:

one or more processors configured to:

to estimate, for each one of at least a pair of said loudspeakers, a model transfer function at each of a plurality M of measurement points that are control points, distributed in Z≥2 spatially separated listening zones in a listening environment of said sound system, the model transfer function representing sound propagation from the loudspeaker to the respective control point as a model impulse response, determine, for each of said M control points, a zone-dependent target transfer function, representing a target impulse response, at least based on a zone affiliation of the control point, said zone-dependent target transfer function in each control point being based on phase differences between at least a pair of said loudspeakers in said control point, said phase differences being defined by at least one of the model transfer functions in said control point, the phase characteristics of said zone-dependent target transfer functions differing between control points affiliated with different listening zones, determine said filter coefficients of said audio precompensation controller at least based on said model transfer functions and said target transfer functions of said M control points, and implement parameters of the audio filter based on the determined filter coefficients, the audio filter and the sound system together enabling generation of sound influenced by the audio filter.

12. The filter coefficient determining system of claim 11, wherein the one or more processors is configured to determine the filter coefficients based on optimizing a criterion function, said criterion function at least comprising a target error related to said model transfer functions and said target transfer functions.

13. The filter coefficient determining system of claim 11, wherein one or more processors is configured to determine model transfer functions that are acoustically unsymmetrical for both symmetrical and unsymmetrical setups in relation to the position of said loudspeakers and said listening zones.

14. The filter coefficient determining system of claim 11, wherein one or more processors is configured to estimate a model transfer function at each of said control points based on a model of acoustic properties of the listening environment based on estimating a sound measurement impulse response at each of said control points, based on sound measurements of said sound system, or based on a simulation of a simulated impulse response at each of said control points, said simulation including first order reflections and/or higher order reflections.

15. The filter coefficient determining system of claim 11, wherein one or more processors is configured to determine the filter coefficients based on optimizing a criterion function under the constraint of stability of the dynamics of said audio precompensation controller, said criterion function at least including a weighted summation of powers of differences between compensated model impulse responses and the target impulse responses over said M control points.

16. The filter coefficient determining system of claim 11, wherein said audio precompensation controller has L inputs for L controller input signals and N outputs for N controller output signals, one of the inputs and one of the outputs for each loudspeaker of said sound generating system, wherein at least one of said loudspeaker pairs is specified for said input signals, and/or wherein said filter coefficient determining system further comprises a memory, said memory comprising instructions executable by the one or more processors, whereby the one or more processors is operative to determine said filter coefficients of said audio precompensation controller.

17. The filter coefficient determining system of claim 12, wherein the criterion function additionally comprises differences between representations of compensated model transfer functions of at least a pair of said loudspeakers.

18. The filter coefficient determining system of claim 15, wherein the criterion function further includes a weighted summation of powers of differences between representations of compensated model transfer functions of at least a pair of said loudspeakers.

19. A computer-program product comprising a non-transitory computer-readable storage medium having stored thereon a computer program for determining, when executed by a processor, filter coefficients of an audio precompensation controller for compensation of an associated sound system including N≥2 loudspeakers, the audio precompensation controller being implemented as an audio filter, said computer program comprises instructions, which when executed by the processor causes the processor to:

estimate, for each one of at least a pair of said loudspeakers, a model transfer function at each of a plurality M of measurement points that are control points, distributed in Z≥2 spatially separated listening zones in a listening environment of said sound system, the model transfer function representing sound propagation from the loudspeaker to the respective control point as a model impulse response;

determine, for each of said M control points, a zone-dependent target transfer function, representing a target impulse response, at least based on a zone affiliation of the control point, said zone-dependent target transfer function in each control point being determined based on phase differences between at least a pair of said loudspeakers in said control point, said phase differences being defined by at least one of the model transfer functions in said control point, phase characteristics of said zone-dependent target transfer functions differing between control points affiliated with different listening zones;

determine said filter coefficients of said audio precompensation controller at least based on said model transfer functions and said target transfer functions of said M control points; and implement parameters of the audio filter based on the determined filter coefficients, the audio filter and the sound system together enabling generation of sound influenced by the audio filter.

20. An apparatus for determining filter coefficients of an audio precompensation controller for compensation of an associated sound system including N≥2 loudspeakers, the audio precompensation controller being implemented as an audio filter, the apparatus comprising:

one or more processors configured to estimate, for each one of at least a pair of said loudspeakers, a model transfer function at each of a plurality M of measurement points that are control points, distributed in Z≥2 spatially separated listening zones in a listening environment of said sound system, the model transfer function representing sound propagation from the loudspeaker to the respective control point as a model impulse response, define, for each of said M control points, a zone-dependent target transfer function, representing a target impulse response, at least based on a zone affiliation of the control point, said zone-dependent target transfer function in each control point being determined based on phase differences between at least a pair of said loudspeakers in said control point, said phase differences being defined by at least one of the model transfer functions in said control point, phase characteristics of said zone-dependent target transfer functions differing between control points affiliated with different listening zones, determine said filter coefficients of said audio precompensation controller at least based on said model transfer functions and said target transfer functions of said M control points, and implement parameters of the audio filter based on the determined filter coefficients, the audio filter and the sound system together enabling generation of sound influenced by the audio filter.

* * * * *